United States Patent
Eger et al.

(10) Patent No.: US 11,431,538 B2
(45) Date of Patent: Aug. 30, 2022

(54) TURBO PEAK RECONSTRUCTION FOR HYBRID PAPR REDUCTION SCHEME

(71) Applicant: QUALCOMM Incorporated, San Diego, CA (US)

(72) Inventors: Ory Eger, Tel Aviv (IL); Assaf Touboul, Netanya (IL); Noam Zach, Kiryat Ono (IL); Sharon Levy, Binyamina (IL); Guy Wolf, Rosh Haayin (IL); Shay Landis, Hod Hasharon (IL); Ran Berliner, Kfar-Aviv (IL); Gideon Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/146,696

(22) Filed: Jan. 12, 2021

(65) Prior Publication Data

US 2021/0234740 A1 Jul. 29, 2021

Related U.S. Application Data

(60) Provisional application No. 62/966,724, filed on Jan. 28, 2020.

(51) Int. Cl.
*H04L 27/26* (2006.01)

(52) U.S. Cl.
CPC ...... *H04L 27/2602* (2013.01); *H04L 27/2623* (2013.01)

(58) Field of Classification Search
CPC ............. H04L 27/2602; H04L 27/2628; H04L 25/067; H04L 27/2624; H04L 27/2614; H04L 27/2623

See application file for complete search history.

(56) References Cited

U.S. PATENT DOCUMENTS

| | | | | |
|---|---|---|---|---|
| 8,315,151 B2 * | 11/2012 | Ancora | ............... | H04W 52/143 370/344 |
| 2009/0080556 A1 * | 3/2009 | Duan | ................... | H04L 27/2617 714/746 |
| 2012/0189070 A1 * | 7/2012 | Kroeger | ............. | H04L 27/2623 375/297 |
| 2016/0036561 A1 * | 2/2016 | Stopler | ................... | G06F 11/10 714/776 |
| 2016/0065275 A1 * | 3/2016 | Reuven | ................... | H04L 1/005 375/267 |
| 2021/0306194 A1 * | 9/2021 | Eger | ................... | H04L 27/2647 |

\* cited by examiner

*Primary Examiner* — Khanh C Tran
(74) *Attorney, Agent, or Firm* — Holland and Hart

(57) ABSTRACT

Methods, systems, and devices for wireless communications are described. In one example, a receiving device (e.g., a UE) may transmit, to a transmitting device (e.g., a base station), a capability indicator indicating a capability of the receiving device to perform peak reconstruction using soft metrics (e.g., expected value, covariance) on symbol decisions. The receiving device may receive, from the transmitting device and based on the capability indicator, control signaling indicating a clipping level applied to generate a signal and a subset of peaks clipped from the signal. The receiving device may receive the signal generated in accordance with the control signaling from the transmitting device and may decode a reconstructed signal based on performing the peak reconstruction on the signal using the soft metrics on symbol decisions, the clipping level, and the subset of the peaks clipped from the signal.

30 Claims, 19 Drawing Sheets

TURBO PEAK RECONSTRUCTION FOR HYBRID PAPR REDUCTION SCHEME

CROSS REFERENCE

The present application for patent claims the benefit of U.S. Provisional Patent Application No. 62/966,724 by EGER et al., entitled "TURBO PEAK RECONSTRUCTION FOR HYBRID PAPR REDUCTION SCHEME," filed Jan. 28, 2020, assigned to the assignee hereof, and expressly incorporated by reference herein.

FIELD OF TECHNOLOGY

The following relates generally to wireless communications and more specifically to turbo peak reconstruction for a hybrid peak to average power ratio (PAPR) reduction scheme.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A signal transmitted by a base station to a UE may have an associated peak to average power ratio (PAPR). As PAPR increases, the efficiency of a power amplifier (PA) amplifying the signal (e.g., a ratio of an output power to an input power for the PA) may decrease. Base stations whose PAs have a decreased efficiency may consume more power.

SUMMARY

The described techniques relate to improved methods, systems, devices, and apparatuses that support turbo peak reconstruction for a hybrid peak to average power ratio (PAPR) reduction scheme. Generally, the described techniques provide for a receiving device (e.g., a user equipment (UE) or base station) to recover peaks of a clipped message. In one example, a UE may transmit a capability indicator indicating a capability of the UE to perform peak reconstruction using soft metrics (e.g., expected value, covariance) on symbols decisions. The UE may receive, based on the capability indicator, control signaling indicating a clipping level applied to generate a signal and a subset of peaks clipped from the signal. The UE may receive the signal generated in accordance with the control signaling and may decode a reconstructed signal based on performing the peak reconstruction on the signal using the soft metrics on symbol decisions, the clipping level, and the subset of the peaks clipped from the signal.

A method for wireless communications by a UE is described. The method may include transmitting a capability indicator indicating a capability of the UE to perform peak reconstruction using soft metrics on symbol decisions, receiving, based on the capability indicator, control signaling indicating a clipping level applied to generate a signal and a subset of peaks clipped from the signal, receiving the signal generated in accordance with the control signaling, and decoding a reconstructed signal generated based on performing the peak reconstruction on the signal using the soft metrics on symbol decisions, the clipping level, and the subset of the peaks clipped from the signal.

An apparatus for wireless communications by a UE is described. The apparatus may include a processor, memory in electronic communication with the processor, and instructions stored in the memory. The instructions may be executable by the processor to cause the apparatus to transmit a capability indicator indicating a capability of the UE to perform peak reconstruction using soft metrics on symbol decisions, receive, based on the capability indicator, control signaling indicating a clipping level applied to generate a signal and a subset of peaks clipped from the signal, receive the signal generated in accordance with the control signaling, and decode a reconstructed signal generated based on performing the peak reconstruction on the signal using the soft metrics on symbol decisions, the clipping level, and the subset of the peaks clipped from the signal.

Another apparatus for wireless communications by a UE is described. The apparatus may include means for transmitting a capability indicator indicating a capability of the UE to perform peak reconstruction using soft metrics on symbol decisions, means for receiving, based on the capability indicator, control signaling indicating a clipping level applied to generate a signal and a subset of peaks clipped from the signal, means for receiving the signal generated in accordance with the control signaling, and means for decoding a reconstructed signal generated based on performing the peak reconstruction on the signal using the soft metrics on symbol decisions, the clipping level, and the subset of the peaks clipped from the signal.

A non-transitory computer-readable medium storing code for wireless communications by a UE is described. The code may include instructions executable by a processor to transmit a capability indicator indicating a capability of the UE to perform peak reconstruction using soft metrics on symbol decisions, receive, based on the capability indicator, control signaling indicating a clipping level applied to generate a signal and a subset of peaks clipped from the signal, receive the signal generated in accordance with the control signaling, and decode a reconstructed signal generated based on performing the peak reconstruction on the signal using the soft metrics on symbol decisions, the clipping level, and the subset of the peaks clipped from the signal.

In some examples of the method, apparatuses, and non-transitory computer-readable medium described herein, transmitting the capability indicator may include operations, features, means, or instructions for transmitting the capability indicator indicating the capability of the UE to perform the peak reconstruction that may be coded peak reconstruction.

In some examples of the method, apparatuses, and non-transitory computer-readable medium described herein, receiving the control signaling may include operations, features, means, or instructions for receiving the control signaling indicating the clipping level that may be a threshold at which the signal may be clipped.

In some examples of the method, apparatuses, and non-transitory computer-readable medium described herein, receiving the control signaling may include operations, features, means, or instructions for receiving the control signaling indicating each location and amplitude of a clipped peak sample for the subset of the peaks clipped from the signal.

In some examples of the method, apparatuses, and non-transitory computer-readable medium described herein, receiving the control signaling may include operations, features, means, or instructions for receiving the control signaling via a control channel.

In some examples of the method, apparatuses, and non-transitory computer-readable medium described herein, receiving the control signaling may include operations, features, means, or instructions for receiving the control signaling in a control message multiplexed on a data channel.

In some examples of the method, apparatuses, and non-transitory computer-readable medium described herein, receiving the control signaling may include operations, features, means, or instructions for receiving the control signaling indicating to perform the peak reconstruction using the soft metrics on symbol decisions during decoding of the reconstructed signal.

In some examples of the method, apparatuses, and non-transitory computer-readable medium described herein, receiving the signal may include operations, features, means, or instructions for receiving the signal via a data channel.

In some examples of the method, apparatuses, and non-transitory computer-readable medium described herein, decoding the reconstructed signal may include operations, features, means, or instructions for iteratively performing the peak reconstruction on the signal using the soft metrics on symbol decisions until no new peaks may be generated during a current iteration of the peak reconstruction.

In some examples of the method, apparatuses, and non-transitory computer-readable medium described herein, decoding the reconstructed signal may include operations, features, means, or instructions for iteratively performing the peak reconstruction on the signal using the soft metrics on symbol decisions to generate a set of candidate peaks to add to the signal to generate the reconstructed signal.

In some examples of the method, apparatuses, and non-transitory computer-readable medium described herein, decoding the reconstructed signal may include operations, features, means, or instructions for performing a first stage of the peak reconstruction to generate a first stage reconstructed signal based on the signal, a location and amplitude of one or more of the subset of the peaks clipped from the signal, and the clipping level.

In some examples of the method, apparatuses, and non-transitory computer-readable medium described herein, decoding the reconstructed signal may include operations, features, means, or instructions for performing a second stage of the peak reconstruction on the first stage reconstructed signal to generate the reconstructed signal based on performing at least one iteration of frequency domain symbol reconstruction using the soft metrics on symbol decisions generated by demapping at least one iteration of the first stage reconstructed signal.

In some examples of the method, apparatuses, and non-transitory computer-readable medium described herein, decoding the reconstructed signal may include operations, features, means, or instructions for performing a second stage of the peak reconstruction on the first stage reconstructed signal to generate the reconstructed signal based on performing at least one iteration of frequency domain symbol reconstruction using the soft metrics on symbol decisions generated by demapping and channel decoding at least one iteration of the first stage reconstructed signal.

A method for wireless communications by a base station is described. The method may include receiving a capability indicator indicating a capability of a UE to perform peak reconstruction using soft metrics on symbol decisions, transmitting, based on the capability indicator, control signaling indicating a clipping level applied to generate a signal and a subset of peaks clipped from the signal, and transmitting the signal generated in accordance with the control signaling.

An apparatus for wireless communications by a base station is described. The apparatus may include a processor, memory in electronic communication with the processor, and instructions stored in the memory. The instructions may be executable by the processor to cause the apparatus to receive a capability indicator indicating a capability of a UE to perform peak reconstruction using soft metrics on symbol decisions, transmit, based on the capability indicator, control signaling indicating a clipping level applied to generate a signal and a subset of peaks clipped from the signal, and transmit the signal generated in accordance with the control signaling.

Another apparatus for wireless communications by a base station is described. The apparatus may include means for receiving a capability indicator indicating a capability of a UE to perform peak reconstruction using soft metrics on symbol decisions, means for transmitting, based on the capability indicator, control signaling indicating a clipping level applied to generate a signal and a subset of peaks clipped from the signal, and means for transmitting the signal generated in accordance with the control signaling.

A non-transitory computer-readable medium storing code for wireless communications by a base station is described. The code may include instructions executable by a processor to receive a capability indicator indicating a capability of a UE to perform peak reconstruction using soft metrics on symbol decisions, transmit, based on the capability indicator, control signaling indicating a clipping level applied to generate a signal and a subset of peaks clipped from the signal, and transmit the signal generated in accordance with the control signaling.

In some examples of the method, apparatuses, and non-transitory computer-readable medium described herein, receiving the capability indicator may include operations, features, means, or instructions for receiving the capability indicator indicating the capability of the UE to perform the peak reconstruction that may be coded peak reconstruction.

In some examples of the method, apparatuses, and non-transitory computer-readable medium described herein, transmitting the control signaling may include operations, features, means, or instructions for transmitting the control signaling indicating the clipping level that may be a threshold at which the signal may be clipped.

In some examples of the method, apparatuses, and non-transitory computer-readable medium described herein, transmitting the control signaling may include operations, features, means, or instructions for transmitting the control signaling indicating each location and amplitude of a clipped peak sample for the subset of the peaks clipped from the signal.

In some examples of the method, apparatuses, and non-transitory computer-readable medium described herein, transmitting the control signaling may include operations, features, means, or instructions for transmitting the control signaling via a control channel.

In some examples of the method, apparatuses, and non-transitory computer-readable medium described herein, transmitting the control signaling may include operations, features, means, or instructions for transmitting the control signaling indicating to perform the peak reconstruction using the soft metrics on symbol decisions output by a demapper.

In some examples of the method, apparatuses, and non-transitory computer-readable medium described herein, transmitting the control signaling may include operations, features, means, or instructions for transmitting the control signaling indicating to perform the peak reconstruction using the soft metrics on symbol decisions output by a channel decoder.

In some examples of the method, apparatuses, and non-transitory computer-readable medium described herein, transmitting the signal may include operations, features, means, or instructions for transmitting the signal via a data channel.

DETAILED DESCRIPTION

A base station may perform orthogonal frequency division multiple access (OFDMA) communications with a UE, which may involve the base station transmitting signals with a higher peak to average power ratio (PAPR) as compared to performing single carrier techniques. Base stations which transmit signals with higher PAPRs may have power amplifiers (PA) that exhibit decreased efficiency (e.g., a decreased ratio of output power to input power), which may lead to the base station consuming more power. As such, reducing PAPR may reduce power consumption.

One such method of reducing PAPR may be to clip or chop off each peak of a signal that is above a clipping threshold, which may also be referred to as a clipping level, and to fill in the peaks with pre-determined values below the clipping threshold. Additionally, the method may include transmitting a reduced peak suppression info message (RPSIM) that includes information about the chopped peaks, which may enable a UE receiving the clipped signal to at least partially reconstruct the original signal (e.g., the signal prior to being clipped). However, such methods of reconstructing the original signal may, in some cases, fail to reconstruct the signal in a way such that the UE is able to accurately determine which symbols the signal maps to (e.g., such that the UE detects below a threshold number of symbol incorrectly).

A method that may increase a capability of a UE to accurately map a received clipped signal to a set of symbols and/or to more accurately reconstruct the original signal prior to clipping may be described herein. Such a method may involve the UE transmitting, to a base station, a capability indicator indicating a capability of the UE to perform peak reconstruction using soft metrics (e.g., expected value, covariance) on symbol decisions generated by a demapper or a channel decoder. The UE may receive, from the base station, control signaling (e.g., the RPSIM) indicating a clipping level applied to generate the clipped signal and a subset of peaks clipped from the clipped signal. The UE may receive the clipped signal in accordance with the control signaling (e.g., the RPSIM) from the base station. Upon receiving the clipped signal, the UE may decode a reconstructed signal based on performing peak reconstruction on the signal using the soft metrics on the symbol decisions, the clipping level indicated by the RPSIM, and the subset of the peaks clipped from the signal indicated by the RPSIM.

Aspects of the disclosure are initially described in the context of wireless communications systems. Additional aspects of the disclosure are described in the context of an additional wireless communications system, a signal modification scheme, devices, and a process flow. Aspects of the disclosure are further illustrated by and described with reference to apparatus diagrams, system diagrams, and flowcharts that relate to turbo peak reconstruction for a hybrid PAPR reduction scheme.

Figure 1:
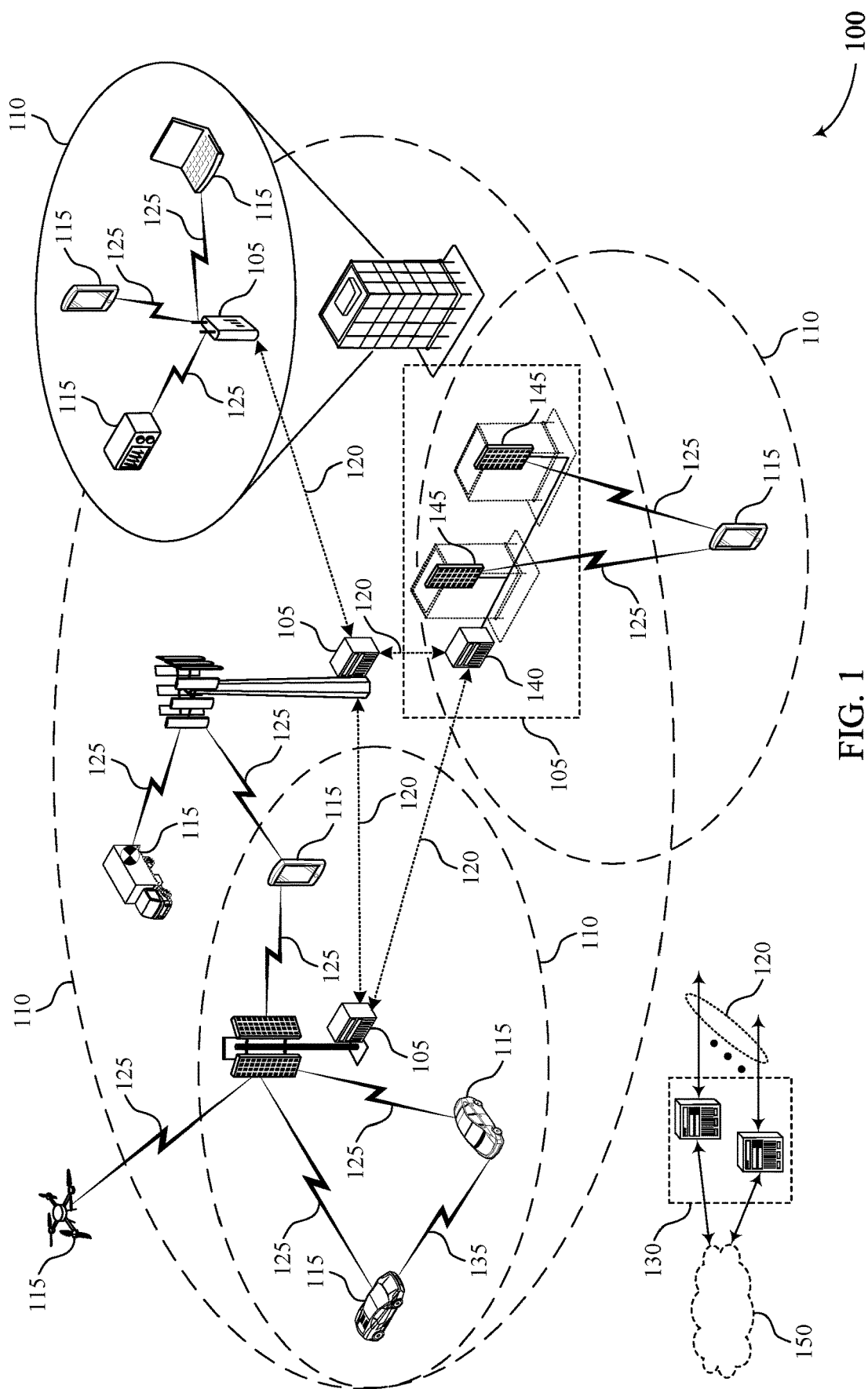
FIG. 1 illustrates an example of a wireless communications system in accordance with aspects of the present disclosure.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Performing OFDMA may have several advantages. For instance, OFDMA may simplify channel estimation that a receiver (e.g., a UE 115 receiving a signal from a base station 105) may perform and may enable additional flexibility in utilizing additional time and frequency resources as compared to single carrier techniques. However, performing OFDMA may also increase a peak to average power ratio (PAPR) as compared to single carrier techniques. As the PAPR increases, the power efficiency $\mu = P_{out}/P_{in}$ of a power amplifier (PA) may exhibit increasingly non-linear behavior at a lower $P_{in}$ ($P_{out}$ may increase less for a proportional increase in $P_{in}$). In one example, for a lower PAPR, the power efficiency may be approximately linear from $P_{in}=0$ to $P_{in}=P_x$ (where $P_x$ may be referred to as a working point for the lower PAPR) and, for a higher PAPR, the power efficiency may be approximately linear from $P_{in}=0$ to $P_{in}=P_y$ (where $P_y$ may be referred to as a working point for the higher PAPR), where $P_x > P_y$. To enhance (e.g., maximize) the power efficiency a power amplifier may be operated with the working point near the non-linear part of the power efficiency curve. Additionally, the rate of change of $P_{out}$ at $P_x$ for the lower PAPR may be higher than the rate of change of $P_{out}$ at $P_x$ for the higher PAPR. The backoff of $P_y$ (e.g., a difference between a saturation power and a $P_{out}$ at $P_y$) may be larger than the backoff of $P_x$ (e.g., a difference between the saturation power and a $P_{out}$ at $P_x$).

As the size of or a number of points in a signal constellation increases (e.g., 256 quadrature amplitude modulation (QAM) to 1024 QAM to 16KQAM and so on), a transmitter (e.g., a base station 105) may use more power to achieve a same error vector magnitude (EVM), which may result in higher power consumption. However, if the transmitter is transmitting a signal with a higher PAPR at a high $P_{in}$ (e.g., to compensate for EVM), the power efficiency $\mu$ of the PA amplifying the signal may be lower than that for transmitting a signal with a lower PAPR at the same $P_{in}$. As such, methods which reduce the PAPR may enable more efficient power consumption (e.g., enable a working point with higher power efficiency) while achieving EVM performance used for maintaining constellations of increasing size. Such methods may be described in further detail with reference to FIG. 2.

Generally, the techniques described herein may provide for a receiving device (e.g., a UE 115 or base station 105) to recover peaks of a clipped message in cases where the receiving device lacks sufficient information to do so by other methods. In one example, a UE 115 may transmit a capability indicator indicating a capability of the UE 115 to perform peak reconstruction using soft metrics (e.g., expected value, covariance) on symbols decisions. Such a capability may refer to a turbo peaks reconstruction capability if the UE 115, which may refer to a UE 115 that performs the methods as described herein with a demapper (e.g., FIG. 4), or may refer to a turbo coded peaks reconstruction capability, which may refer to a UE 115 that performs the methods as described herein with a demapper and a channel decoder (e.g., FIG. 5). The UE 115 may receive, based on the capability indicator, control signaling indicating a clipping level applied to generate a signal and a subset of peaks clipped from the signal. The UE 115 may receive the signal generated in accordance with the control signaling and may decode a reconstructed signal based on performing the peak reconstruction on the signal using the soft metrics on symbol decisions, the clipping level, and the subset of the peaks clipped from the signal.

Figure 2:
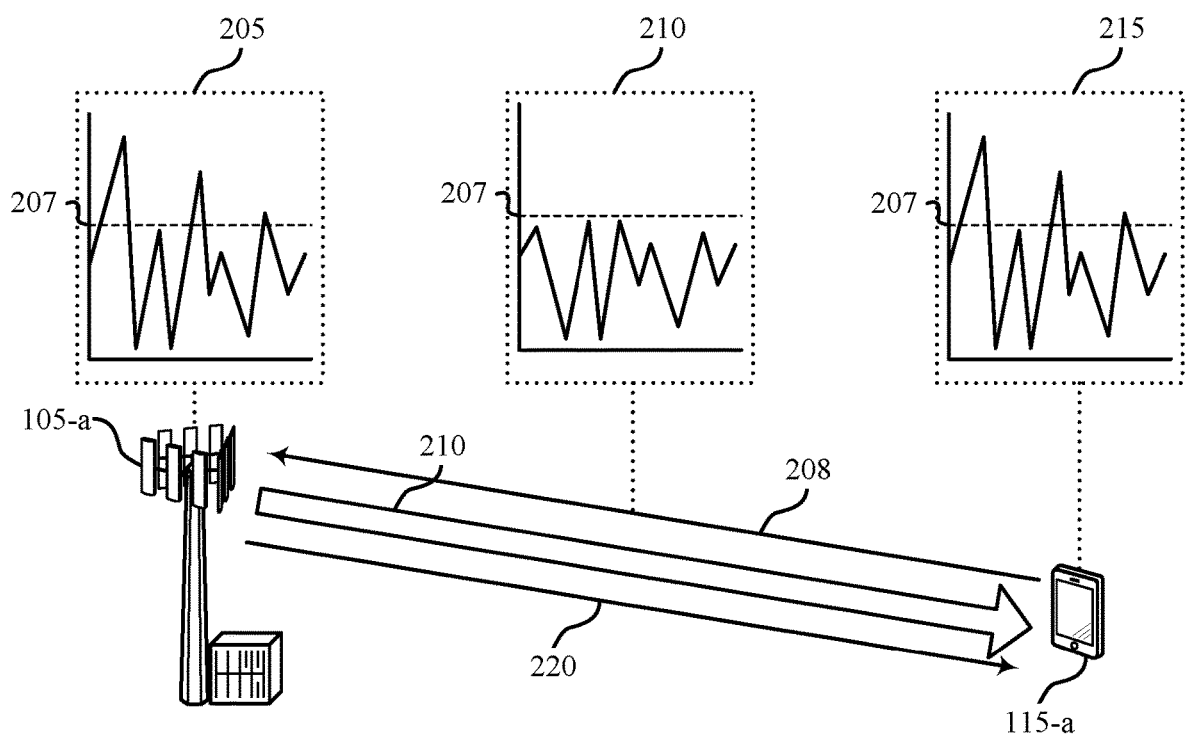
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. Base station 105-a may be an example of a base station 105 as described with reference to FIG. 1 and UE 115-a may be an example of a UE 115 as described with reference to FIG. 1.

Initially, base station 105-a may generate a signal 205 with multiple peaks above clipping threshold 207. To lower a PAPR of the signal 205 for symbols (e.g., data symbols), the base station 105-a may clip or chop off peaks of the signal 205 above the clipping threshold 207 and may fill pre-determined values in their place. Performing such a procedure may result in clipped signal 210. Further details of the procedure may be described with reference to FIG. 3. Base station 105-a may transmit the clipped signal 210 to UE 115-a. In some cases, base station 105-a may transmit the clipped signal 210 via a data channel (e.g., a physical downlink shared channel (PDSCH)).

UE 115-a, upon receiving the clipped signal 210, may perform one or more procedures that generate reconstructed signal 215, which may be an approximate reconstruction of signal 205. UE 115-a may perform such one or more procedures because clipped signals 210 with chopped peaks may have blurrier or less easily decipherable constellations as opposed to reconstructed signals 215 with reconstructed peaks. In some examples, the one or more procedures may involve UE 115-a performing a first stage of peak reconstruction and a second stage of peak reconstruction. The first stage may involve UE 115-a receiving control signaling 220 (e.g., an RPSIM message) that indicates a location and amplitude of one or more of the clipped or chopped off peaks and the clipping threshold 207, and may also involve using clipped signal 210 and the information indicated by control signaling 220 to generate a first stage reconstructed signal. Base station 105-a may transmit control signaling 220 via a control channel (e.g., a physical downlink control channel (PDCCH) or a dedicated control channel) or in a control message multiplexed on a data channel.

The second stage, as described with reference to FIG. 3, may involve performing a hard decision on constellation points of the first stage reconstructed signal; generating a transformed signal using a symbol mapping produced from the hard decision; and inserting peaks from the transformed signal into the first stage reconstructed signal. UE 115-a may perform such a process iteratively and may generate reconstructed signal 215, which may be referred to as a second stage reconstructed signal, according to this iterative process. However, performing the second stage in this manner may fail to generate a reconstructed signal 215 similar enough to signal 205 for accurate decoding if the control signaling 220 fails to include enough peaks.

As such, UE 115-a may instead perform the methods as described with reference to FIG. 4 and FIG. 5 for the second stage. Performing such methods may involve UE 115-a performing at least one iteration of frequency domain symbol reconstruction using soft metrics on symbol decisions generated by demapping and/or channel decoding at least one iteration of the first stage reconstructed signal. The soft metrics may include an expected value of a symbol decision and/or a covariance of a symbol decision with itself. To aid in performing the methods as described with reference to FIGS. 4 and 5, UE 115-a may transmit a capability indicator 208 (e.g., a capability bit) indicating a capability of UE 115-a to perform peak reconstruction using soft metrics on symbol decisions. For example, UE 115-a may transmit capability indicator 208 indicating having a soft reconstruction capability (e.g., a capability to perform the methods of FIG. 4), and/or indicating having a coded reconstruction capability (e.g., a capability to perform the methods of FIG. 5). Base station 105-a may choose a peak selection method based on receiving the capability indicator 208 (e.g., pick one of the soft reconstruction capability and the coded reconstruction capability based on which the UE 115-a indicates it is capable of performing). In some cases, control signaling 220 may include an indication of which peak construction method UE 115-a is to use (e.g., soft reconstruction or coded reconstruction).

Performing peak reconstruction using soft metrics on symbol decisions may have several advantages. For instance, performing peak reconstruction using soft metrics may quantify confidence in symbol decisions. Additionally, the signal that is produced via peak reconstruction using soft metrics may, on average, more closely resemble signal 205 as opposed to performing peak reconstruction with hard decisions. As such, UE 115-a may, on average, have a higher likelihood of correctly detecting symbols.

Although the examples presented herein are directed to downlink communications (e.g., communications from base station 105-a to UE 115-a), in some cases the roles of UE 115-a and base station 105-a may be reversed to enable the methods described herein to be used for uplink communications. For instance, UE 115-a may generate a signal 205, may clip the signal to produce a clipped signal 210, and may transmit the clipped signal 210 to base station 105-a. Base station 105-a may perform peak reconstruction on the clipped signal 210 to generate reconstructed signal 215. In such cases, base station 105-a may transmit a capability indicator 208 to UE 115-a and UE 115-a may transmit control signaling 220 to base station 105-a that indicates a location and amplitude of one or more of the clipped or chopped off peaks and the clipping threshold 207.

Figure 3:
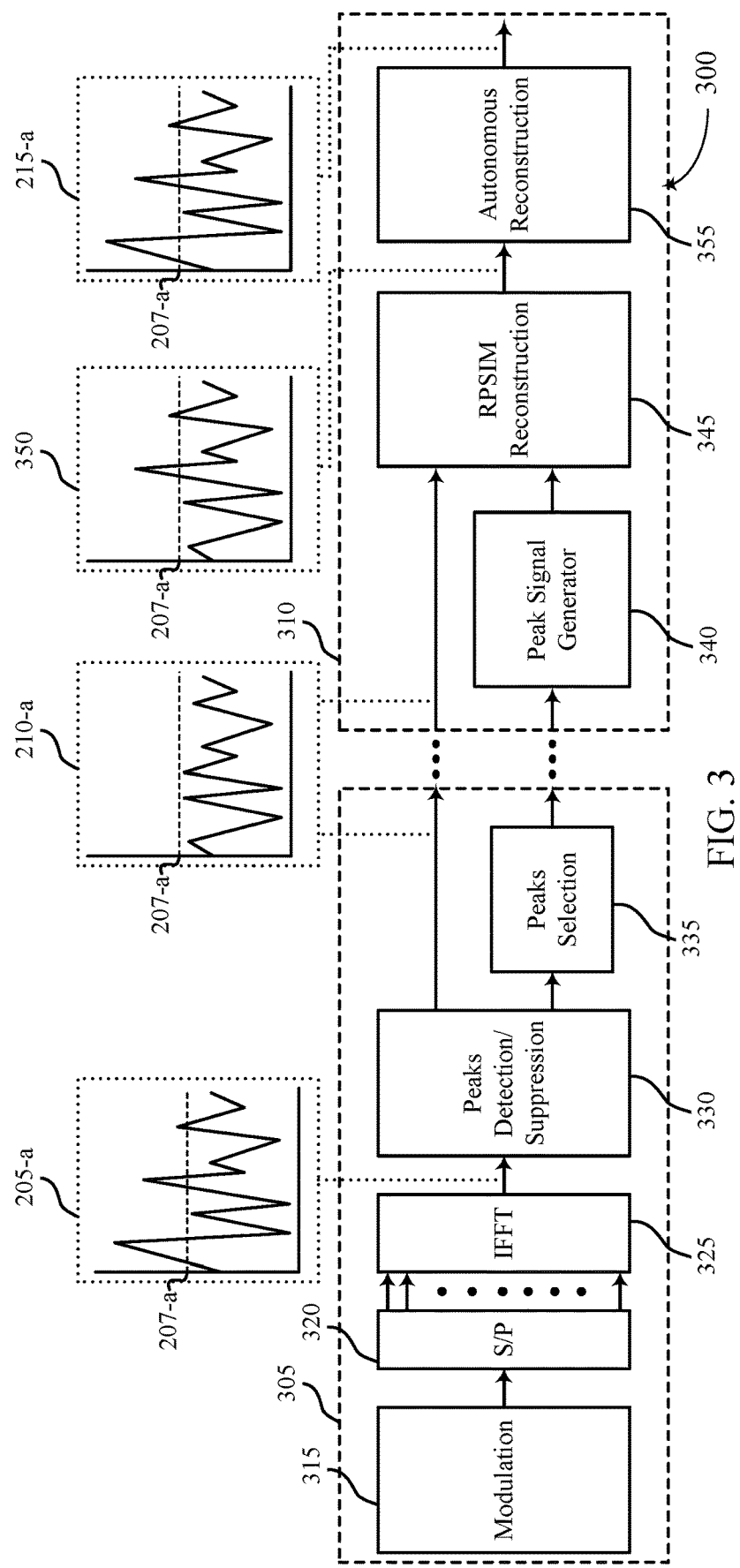
FIG. 3 illustrates an example of a signal modification scheme in accordance with aspects of the present disclosure.

FIG. 3 illustrates an example of a signal modification scheme 300 in accordance with aspects of the present disclosure. In some examples, signal modification scheme 300 may implement aspects of wireless communications system 100. For downlink communications, transmitting device 305 may be an example of a base station 105 as described with reference to FIG. 1 and receiving device 310 may be an example of a UE 115 as described with reference to FIG. 1. For uplink communications, transmitting device 305 may be an example of a UE 115 as described with reference to FIG. 1 and receiving device 310 may be an example of a base station 105 as described with reference to FIG. 1.

Initially, the transmitting device 305 may use modulation component 315 to produce a signal. For instance, modulation component 315 may map symbols stored at the transmitting device 305 to signals of particular amplitude and phase. As such, modulation component 315 may produce a signal in the frequency domain according to the amplitude and phase associated with each symbol to be transmitted. Modulation component 315 may also apply a precoding matrix to the signal. Modulation component 315 may output the signal to serial-to-parallel (S/P) component 320, which may perform serial to parallel conversion on the signal, and may output the converted signal to inverse fast fourier transform (IFFT) component 325. IFFT component 325 may perform IFFT on the converted signal and may output signal 205-a to peak detection and suppression component 330.

Signal 205-*a* may be an example of a signal 205 as described with reference to FIG. 2. Signal 205-*a* may have one or more peaks above clipping threshold 207-*a*.

Peak detection and suppression component 330 may detect the peaks of signal 205-*a*. For instance, peak detection and suppression component 330 may detect each of the peaks of the signal 205-*a* and may determine which of the peaks are above the clipping threshold 207-*a*. Additionally or alternatively, the transmitting device may detect just the peaks that are above the clipping threshold 207-*a*. In whichever case, peak detection and suppression component 330 may clip off the detected peaks of the in-phase quadrature (IQ) samples signal 205-*a* passing a clipping threshold 207-*a* and may fill pre-determined values in their place to produce clipped signal 210-*a*, which may be an example of a clipped signal 210 as describe with reference to FIG. 2. The transmitting device 305 may transmit the clipped signal 210-*a* to the receiving device 310.

Peak selection component 335 may select which peaks of signal 205-*a* above clipping threshold 207-*a* to indicate to the receiving device 310 via control signaling (e.g., via an RPSIM). Peak selection component 335 may select a subset of the peaks clipped from signal 205-*a* (e.g., a subset of the total number of peaks above clipping threshold 207-*a*). Transmitting device 305 may transmit the control signaling to the receiving device 310 after selecting the subset of the peaks clipped from signal 205-*a*. The control signaling may indicate each location and amplitude of a clipped peak sample for the subset of the peaks clipped from signal 205-*a*. The control signaling may be compressed and transmitted over a control channel (e.g., a control channel dedicated to transmitting an RPSIM).

Peaks signal generator 340 may receive the control signaling, decode the control signaling, and may generate peak signals (e.g., signals including the indicated peaks) according to the decoded control signaling. The peaks signal generator 340 may apply a fast fourier transform (FFT) to the peaks signal and may transmit the peaks signal in the frequency domain to the RPSIM reconstruction component 345. RPSIM reconstruction component 345 may receive clipped signal 210-*a* and may perform an FFT on the clipped signal 210-*a* to acquire clipped signal 210-*a* in the frequency domain. RPSIM reconstruction component 345 may process a data path chest of clipped signal 210-*a*, may equalize a channel of clipped signal 210-*a*, may expand the channel of clipped signal 210-*a* to obtain a full channel, and may revert or undo the precoding matrix applied by modulation component 315. RPSIM reconstruction component 345 may combine the clipped signal 210-*a* and the peaks signal (e.g., after processing the data path chest, equalizing the channel, expanding the channel, and reverting the precoding matrix) to generate first stage reconstructed signal 350. First stage reconstructed signal 350 may include peaks corresponding to the subset of peaks clipped from signal 205-*a* and indicated by the control signaling, but may not include the peaks not in the subset.

To aid in reconstructing the signal with these other peaks, the receiving device 310 may use autonomous reconstruction component 355. Autonomous reconstruction may involve autonomous reconstruction component 355 making a hard decision on constellation points. For instance, if signal 205-*a* was modulated according to 256 QAM, the constellation may be divided into 256 areas, where each area is associated with a different one of 256 different possible symbols. If a first portion of the first stage reconstructed signal 350 maps to a first area of the constellation (e.g., has a phase and amplitude close to that of the symbol to which the first area maps), the receiving device 310 may determine that the first portion of the signal maps to the symbol associated with the first area.

Upon performing the hard decision, autonomous reconstruction component 355 may generate a signal using the symbol mapping determined from the hard decision. The receiving device may perform an IFFT on this signal and may insert peaks from the transformed signal into first stage reconstructed signal 350. In some cases, autonomous reconstruction 255 may be an iterative process. For instance, the receiving device 310, upon generating the signal resulting from inserting peaks from the transformed signal into first stage reconstructed signal 350 (i.e., the resultant signal) may perform a hard decision on the constellation of the resultant signal, may generate a new signal from the hard decision, may perform an IFFT on the new signal, and may insert peaks from the new transformed signal into first stage reconstructed signal 350. If performing a single iteration, the resultant signal may be reconstructed signal 215-*a*. If performing multiple iterations, reconstructed signal 215-*a* may be a signal created by combining peaks generated in the last iteration with first stage reconstructed signal 350.

Once the last iteration has been performed, the receiving device 310 may have generated reconstructed signal 215-*a*, where reconstructed signal 215-*a* may more accurately resemble signal 205-*a* than first stage reconstructed signal 350. The receiving device 310 may perform channel reduction on reconstructed signal 215-*a* and may reapply the precoding matrix to first stage reconstructed signal 350. Additionally, the receiving device 310 may demodulate the data and may decode it. When control signaling (e.g., RPSIM) is sent to the receiving device 310 with enough represented peaks (e.g., above a threshold amount), performing the hard decision using slicing may result in sufficiently small decision errors (e.g., below a threshold amount) and a sufficiently accurate reconstruction of peaks.

However, there may be instances where reconstructed signal 215-*a* does not more accurately resemble signal 205-*a* or has a number of symbol errors above a threshold amount. Such errors may occur when the control signaling (e.g., the RPSIM) transmitted to the receiving device 310 represents below a threshold amount of peaks (e.g., RPSIM indicates too few peaks), which may lead to the symbol constellation being blurry (e.g., having candidates which deviate from constellation points by more than a threshold amount). In such cases, a hard decision using slicing may lead to decision errors above a threshold amount and may result in imperfect reconstruction of peaks by autonomous reconstruction component 355. Methods to perform reconstruction which may avoid problems associated with performing hard decisions may be described with reference to FIG. 4 and FIG. 5.

Figure 4:
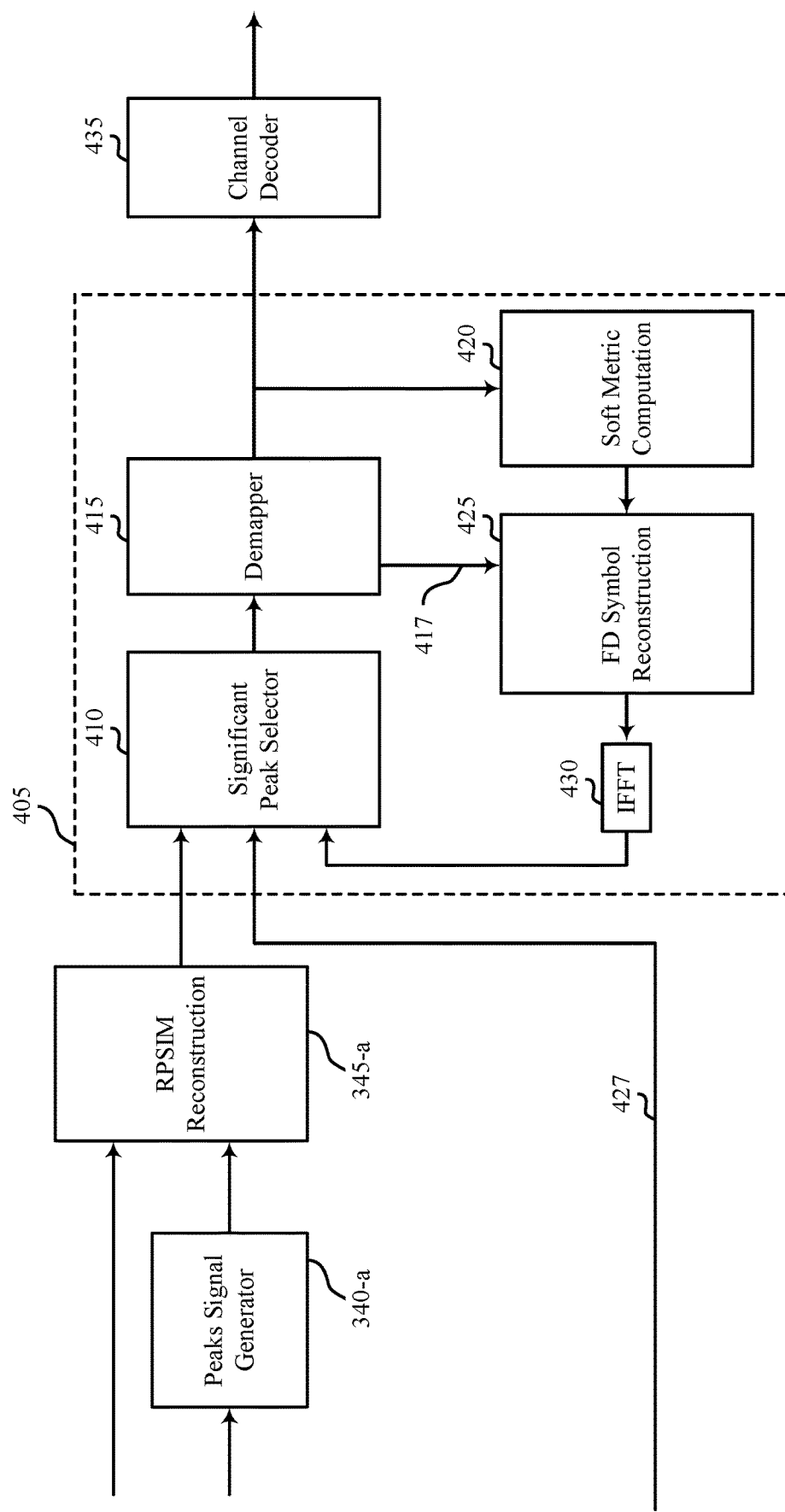
FIG. 4 illustrates an example of a device in accordance with aspects of the present disclosure.

FIG. 4 illustrates an example of a device 400 in accordance with aspects of the present disclosure. In some examples, device 400 may implement aspects of wireless communications system 100. Device 400 may be an example of a receiving device 310 as described with reference to FIG. 3 with modifications and/or a UE 115 (e.g., for downlink communications) or base station 105 (e.g., for uplink communications) as described with reference to FIG. 1. Device 400 may have a peaks signal generator 340-*a* and an RPSIM reconstruction component 345-*a*, which may be examples of peaks signal generator 340 and RPSIM reconstruction component 345 as described with reference to FIG. 3.

FIG. 4 may describe a method of performing the process described herein:

$$X_0 = H^H(H * H^H + R_{nn})^{-1}Y$$
$$x_0 = \text{ifft}(X_0)$$
for l = 0 to $N_{iterations}$ − 1:
  $\{\hat{X}^l, \text{LLR}_b^l\} = \text{LLR Gen}(X^l))$
  for i = 0 to $N_{symbols}$ − 1
    $\hat{X}_i^l = E(\hat{X}_i^l) = \text{func}(\text{LLR}_{b_{i,j}})$
  end
  $\hat{x}^l = \text{ifft}(\hat{X}^l)$
  for n = 1 to $N_{FFT}$
    $x_n^l = \begin{cases} x_n^l = \hat{x}_n^l & \text{if } \hat{x}_n^l > \text{clipping threshold} \\ x_n^l = x_n^l & \text{if } \hat{x}_n^l < \text{clipping threshold} \end{cases}$
  end
  $X^l = \text{fft}(x^l))$
end In some cases, $\hat{X}_i^l = E(\hat{X}_i^l) = \text{func}(\text{LLR}_{b_{i,j}})$ may be substituted with $\hat{X}_i^l = E(\hat{X}_i^l, \hat{X}_i^l) = \text{func}(\text{LLR}_{b_{i,j}})$ or may substituted with if $(E(\hat{X}_i^l) < \text{Threshold}) \rightarrow \hat{X}_i^l = 0$.

Peaks signal generator 340-a may receive control signaling, decode the control signaling, and may generate peak signals (e.g., signals including the indicated peaks) according to the decoded control signaling. Peaks signal generator 340-a may apply an FFT to the peaks signal and may transmit the peaks signal in the frequency domain to the RPSIM reconstruction component 345-a. RPSIM reconstruction component 345-a may receive a clipped signal 210 and may perform an FFT on the clipped signal 210 to acquire clipped signal 210 in the frequency domain. RPSIM reconstruction component 345-a may process a data path channel estimate of the clipped signal 210, may equalize a channel of the clipped signal 210, may expand the channel of the clipped signal 210 to obtain a full channel, and may revert or undo a precoding matrix applied to the clipped signal 210. Determining a frequency domain value of the clipped signal 210 via channel equalization may be done according to $H^H(H*H^H+R_{nn})^{-1}Y$, where Y may be a frequency domain value of the clipped signal 210 prior to equalization, H may represent the wireless channel, and R may represent noise. RPSIM reconstruction component 345-a may combine the clipped signal 210 and the peaks signal (e.g., after processing the data path channel estimate, equalizing the channel, expanding the channel, and reverting the precoding matrix) to generate a first stage reconstructed signal 350. First stage reconstructed signal 350 may include peaks corresponding to the subset of peaks clipped from a signal 205 and indicated by the control signaling, but may not include the peaks not in the subset. The first stage reconstructed signal 350 in the frequency domain may then be converted via an IFFT to form first stage reconstructed signal 350 in the time domain and input into the significant peak selection component 410. Generally, the frequency domain values for the first stage reconstructed signal 350 may be represented as $X_0$ and the time domains value for the first stage reconstructed signal 350 may be represented as $x_0$.

First stage reconstructed signal 350 may enter second stage component 405, where first stage reconstructed signal 350 may undergo one or more iterations of a procedure. The procedure may involve the second stage component 405 performing symbol detection (e.g., using a demapper 415) to generate symbol decisions and calculating soft metrics for each symbol of first stage reconstructed signal 350 based on LLRs (e.g., using a soft metric computation component 420). The procedure may also involve the second stage component 405 performing peak reconstruction (e.g., using a clipping threshold 427 for a signal 205). The second stage component 405 may perform the symbol detection, calculate the soft metrics, and reconstruct the peaks iteratively to update the symbol decisions, soft metrics, and peaks reconstruction. In some cases, the second stage component 405 may iteratively perform the peak reconstruction on first stage reconstructed signal 350 using the soft metrics on symbol decisions to generate a set of candidate peaks to add to the signal to generate the reconstructed signal.

For the first iteration, significant peak selection component 410 may perform an FFT on the first stage reconstructed signal 350 and may output the first stage reconstructed signal 350 in the frequency domain to demapper 415 as is. Demapper 415 may perform symbol detection and may calculate and output a log-likelihood ratio (LLR) for each bit of the first stage reconstructed signal 350 (e.g., according to $\{\hat{X}^i, \text{LLR}_b^l\} = \text{LLR Gen}(X^l)$), where the LLRs may be grouped into symbol decisions (e.g., by grouping bits into a symbol and grouping the LLRs associated with those bits). Soft metric computation component 420 may determine soft metrics for each symbol of the first stage reconstructed signal 350 using the LLRs generated by demapper 415. For instance, soft metric computation component 420 may calculate an expected value or mean E(#) (e.g., $E(X_i) = \Sigma_{x \in B} X p(X_i = X)$) for each symbol of the first stage reconstructed signal 350, a variance for each symbol of the first stage reconstructed signal 350 (e.g., a covariance of a symbol with itself, as demonstrated by $\text{Cov}(X_i, X_i) = \in_{x \in B} |X - E(X_i)|^2 p(X_i = X)$), or both. Soft metric computation component 420 may output the expected value, the covariance, or both for each symbol to frequency domain symbol reconstruction component 425. Additionally, demapper 415 may output the symbol decision 417 for each symbol of the first stage reconstructed signal 350 to frequency domain symbol reconstruction component 425.

Frequency domain symbol reconstruction component 425 may use the expected value, the covariance, the symbol decision 417, or a combination thereof for each symbol to construct a new signal in the frequency domain. For instance, if using expected value, the frequency domain symbol reconstruction component 425 may calculate the frequency domain values of the new signal by performing: for i=0 to $(N_{symbols}-1)$: $\hat{X}_i^l = E(\hat{X}_i^l) = \text{func}(\text{LLR}_{b_{i,j}})$. If using the covariance, the frequency domain symbol reconstruction component 425 may calculate the frequency domain values of the new signal by performing: for i=0 to $(N_{symbols}-1)$: $\hat{X}_i^l = E(\hat{X}_i^l, \hat{X}_i^l) = \text{func}(\text{LLR}_{b_{i,j}})$. In another example, a detected symbol may be included or excluded based in the new signal based on mean. For instance, a hard decision may be taken on a symbol (e.g., according to $\hat{X}_i^l = E(\hat{X}_i^l) = \text{func}(\text{LLR}_{b_{i,j}})$ for i=0 to $(N_{symbols}-1)$) and symbols with a low mean may be excluded (e.g., according to if $(E(\hat{X}_i^l) < \text{Threshold})$ then $\hat{X}_i^l = 0$ where i=0 to $(N_{symbols}-1)$). In yet another example, a detected symbol, the new signal may include the detected symbol or may replace the detected symbol with an original symbol to which the detected symbol corresponds (e.g., $X_i^0$ for $\hat{X}_i^l$) based on mean. For instance, a hard decision may be taken on a symbol (e.g., according to $\hat{X}_i^l = E(\hat{X}_i^l) = \text{func}(\text{LLR}_{b_{i,j}})$ for i=0 to $(N_{symbols}-1)$) and symbols with a low mean may be replaced with the original corresponding symbol (e.g., according to if $(E(\hat{X}_i^l) < \text{Threshold})$ then $\hat{X}_i^l = X_i^0$ where i=0 to $(N_{symbols}-1)$). In some examples, the original symbol may include a symbol of the originally received signal (e.g., a symbol $X_i^0$ of the signal output by RPSIM reconstruction component 345-a or significant peak selection component 410 for the first iteration).

Frequency domain symbol reconstruction component 425 may output the signal to IFFT component 430, which may perform an IFFT on the new signal in the frequency domain to generate the signal in the time domain (e.g., according to $\hat{x}^l = \text{ifft}(\hat{X}^l)$). IFFT component 430 may output the new signal in the time domain to significant peak selection component 410.

Significant peak selection component 410 may use the first stage reconstructed signal 350, a clipping threshold 427, and the new signal to generate a first iteration of a second stage reconstructed signal. For instance, if, for a given point in the time domain, the new signal has a value above the clipping threshold 427, the first iteration of the second stage reconstructed signal may have the value of the new signal for that given point (e.g., $x_n^i = \hat{x}_n^i$ if $\hat{x}_n^i >$ clipping threshold 427). If, however, at the given point in the time domain, the new signal has a value below the clipping threshold 427, the first iteration of the second stage reconstructed signal may have the value of the first stage reconstructed signal 350 at that point (e.g., $x_n^l = x_n^l$ if $\hat{x}_n^l <$ clipping threshold 427). This process may be performed for each sample of the signals (e.g., from n=1 to $N_{FFT}$). The clipping threshold 427 may be received with the control signaling received by peaks signal generator 340-a (e.g., the RPSIM message) or may be received in separate control signaling.

Upon generating the first iteration of the second stage reconstructed signal, the significant peak selection component 410 may perform an FFT on the first iteration of the second stage reconstruction signal (e.g., $X^l = \text{fft}(x^l)$) and may output the first iteration of the second stage reconstructed signal in the frequency domain to demapper 415, which may calculate and output a LLR for each bit of the first iteration of the second stage reconstructed signal. If a single iteration is to be performed, the demapper 415 may output the LLRs to a channel decoder 435, which may convert the LLRs to data bits. If multiple iterations are to be performed (e.g., as according to a threshold value n), the LLRs may be output to soft metric computation component 420 and the procedure as outlined above may continue until the multiple iterations have been performed. Once n iterations have been performed, the demapper 415 may output LLRs for the nth iteration of the second stage reconstructed signal to the channel decoder 435, which may convert the LLRs to data bits. In some cases, the process of iteratively performing the peak reconstruction on first stage reconstructed signal 350 may continue until no new peaks are generated during a last iteration of the peak reconstruction. The device 400 may determine that a current iteration is a last iteration upon determining that no new peaks are generated by comparing the first stage reconstructed signal 350 with the generated peaks of the last iteration to the clipping threshold.

Performing soft decision reconstruction (e.g., performing peak reconstruction using soft metrics) as described herein may have several advantages as compared to heard decision reconstruction (e.g., performing peak reconstruction using hard decisions as described with reference to FIG. 3). For instance, hard decision reconstruction symbol errors may be taken as is and may produce a signal reconstruction with a number of symbol errors above a threshold amount. Soft decision reconstruction may use the symbols for reconstruction according to their soft metrics and, as such, the soft decision reconstruction may have improved mean square error (MSE) and peaks representation as compared to the hard decision reconstruction. Additionally, using soft metrics may quantify confidence in symbol decisions. Additionally, reconstruction may improve in cases where symbols are done (e.g., determined) based on soft metric peaks. Additionally, error propagation may be reduced.

Figure 5:
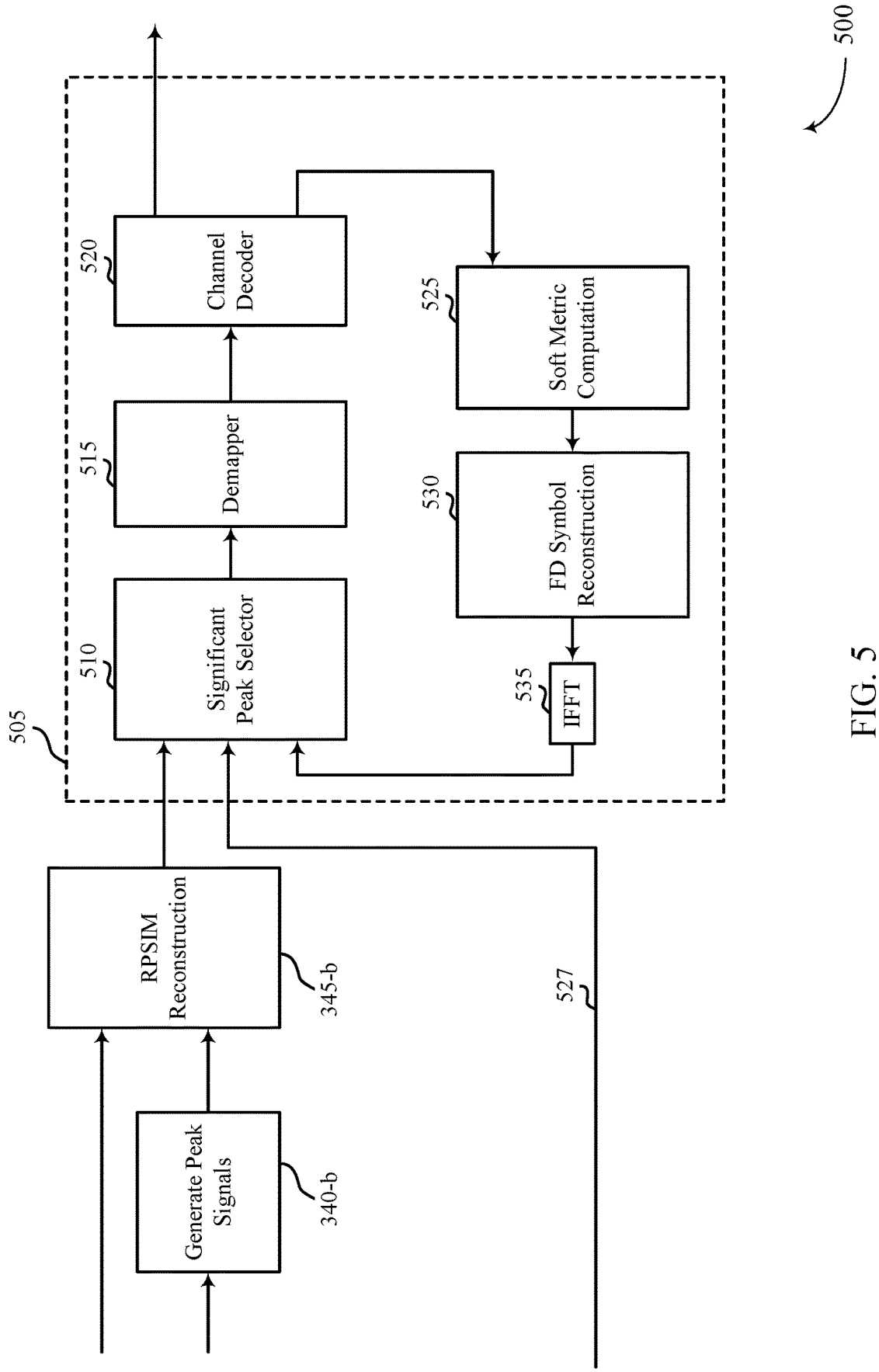
FIG. 5 illustrates an example of a device in accordance with aspects of the present disclosure.

FIG. 5 illustrates an example of a device 500 in accordance with aspects of the present disclosure. In some examples, device 500 may implement aspects of wireless communications system 100. Device 500 may be an example of a receiving device 310 as described with reference to FIG. 3 and/or a UE 115 (e.g., for downlink communications) or base station 105 (e.g., for uplink communications) as described with reference to FIG. 1. Device 400 may have a peaks signal generator 340-b and an RPSIM reconstruction component 345-b, which may be examples of 340 and 345 as described with reference to FIG. 3.

FIG. 5 may describe a method of performing the process described herein:

---

$X_0 = H^H(H * H^H + R_{nn})^{-1}Y$
$x_0 = \text{ifft}(X_0)$
for $l = 0$ to $N_{iterations} - 1$:
    $\{\hat{X}^l, LLR_b^l\} = LLR\ Gen(X^l))$
    for $i = 0$ to $N_{symbols} - 1$
        $\hat{X}_i^l = E(\hat{X}_i^l) = \text{func}(LLR_{b_{i,j}})$
    end
    $\hat{x}^l = \text{ifft}(\hat{X}^l)$
    for $n = 1$ to $N_{FFT}$
$$x_n^l = \begin{cases} x_n^l = \hat{x}_n^l \text{ if } \hat{x}_n^l > \text{clipping threshold} \\ x_n^l = x_n^l \text{ if } \hat{x}_n^l < \text{clipping threshold} \end{cases}$$
    end
    $X^l = \text{fft}(x^l))$
end

---

In some cases, $\hat{X}_i^l = E(\hat{X}_i^l) = \text{func}(LLR_{b_{i,j}})$ may be substituted with $\hat{X}_i^l = E(\hat{X}_i^l, \hat{X}_i^l) = \text{func}(LLR_{b_{i,j}})$ or may substituted with if $(E(\hat{X}_i^l) < \text{Threshold}) \rightarrow \hat{X}_i^l = 0$.

Peaks signal generator 340-b may receive control signaling, decode the control signaling, and may generate peak signals (e.g., signals including the indicated peaks) according to the decoded control signaling. Peaks signal generator 340-b may apply an FFT to the peaks signal and may transmit the peaks signal in the frequency domain to the RPSIM reconstruction component 345-b. RPSIM reconstruction component 345-b may receive a clipped signal 210 and may perform an FFT on the clipped signal 210 to acquire clipped signal 210 in the frequency domain. RPSIM reconstruction component 345-b may process a data path chest of the clipped signal 210, may equalize a channel of the clipped signal 210, may expand the channel of the clipped signal 210 to obtain a full channel, and may revert or undo a precoding matrix applied to the clipped signal 210. Determining a frequency domain value of the clipped signal 210 via channel equalization may be done according to $H^H(H*H^H+R_{nn})^{-1}Y$, where Y may be a frequency domain value of the clipped signal 210 prior to equalization. RPSIM reconstruction component 345-b may combine the clipped signal 210 and the peaks signal (e.g., after processing the data path chest, equalizing the channel, expanding the channel, and reverting the precoding matrix) to generate a first stage reconstructed signal 350. First stage reconstructed signal 350 may include peaks corresponding to the subset of peaks clipped from a signal 205 and indicated by the control signaling, but may not include the peaks not in the subset. The first stage reconstructed signal 350 in the frequency domain may then be converted via an IFFT to form first stage reconstructed signal 350 in the time domain and input into the significant peak selection component 510. Generally, the frequency domain values for the first stage reconstructed signal 350 may be represented as $X_0$ and the time domains value for the first stage reconstructed signal 350 may be represented as $x_0$.

First stage reconstructed signal 350 may enter second stage component 505, where first stage reconstructed signal 550 may undergo one or more iterations of a procedure. The procedure may involve the second stage component 505 performing symbol detection (e.g., using a demapper 515), performing channel decoding (e.g., using a channel decoder 520) to generate symbol decisions, and calculating soft metrics for each symbol of first stage reconstructed signal 350 based on LLRs output from channel decoding (e.g., using a soft metric computation component 525). The procedure may also involve the second stage component 505 performing peak reconstruction (e.g., using a clipping threshold 527 for a signal 205). The second stage component 505 may perform the symbol detection, calculate the soft metrics, and reconstruct the peaks iteratively to update the symbol decisions, soft metrics, and peaks reconstruction. In some cases, the peak reconstruction performed by second stage component 505 may be referred to as coded peak reconstruction due to the second stage component 505 performing channel decoding.

For the first iteration, significant peak selection component 510 may perform an FFT on the first stage reconstructed signal 350 and may output the first stage reconstructed signal 350 in the frequency domain to demapper 515 as is. Demapper 515 may perform symbol detection and may calculate and output a log-likelihood ratio (LLR) for each bit (i.e., LLRs in per bit) of the first stage reconstructed signal 350 (e.g., according to $\{\hat{X}^l, LLR_b{}^l\}$=LLR Gen($X^l$)) where the LLRs may be grouped into symbol decisions (e.g., by grouping bits into a symbol and grouping the LLRs associated with those bits). Channel decoder 520 may receive the LLRs and may decode the detected symbols to generate new LLRs (i.e. LLRs out per bit). The channel decoder may output the new LLRs to soft metric computation component 525.

Soft metric computation component 525 may re-encode the decoded symbols and may determine soft metrics for each symbol of the first stage reconstructed signal 350 using the new LLRs generated by channel decoder 520. For instance, soft metric computation component 525 may calculate an expected value or mean E(#) (e.g., $E(X_i)=\Sigma_{x \in B} Xp(X_i=X)$) for each symbol of the first stage reconstructed signal 350, a variance for each symbol of the first stage reconstructed signal 350 (e.g., a covariance of a symbol with itself, as demonstrated by $Cov(X_i, X_i)=\Sigma_{x \in B}|X-E(X_i)|^2 p(X_i=X)$), or both. Soft metric computation component 525 may output the expected value, the covariance, or both for each symbol to frequency domain symbol reconstruction component 530.

Frequency domain symbol reconstruction component 530 may use the expected value, the covariance, the symbol decision, or a combination thereof for each symbol to construct a new signal in the frequency domain. For instance, if using expected value, the frequency domain symbol reconstruction component 530 may calculate the frequency domain values of the new signal by performing: for i=0 to ($N_{symbols}$−1): $\hat{X}_i^l=E(\hat{X}_i^l)$=func($LLR_{b_{i,j}}$). If using the covariance, the frequency domain symbol reconstruction component 530 may calculate the frequency domain values of the new signal by performing: for i=0 to ($N_{symbols}$−1): $\hat{X}_i^l=E(\hat{X}_i^l, \hat{X}_i^l)$=func($LLR_{b_{i,j}}$). In another example, a detected symbol may be included or excluded based in the new signal based on mean. For instance, a hard decision may be taken on a symbol (e.g., according to $\hat{X}_i^l=E(\hat{X}_i^l)$=func($LLR_{b_{i,j}}$) for i=0 to ($N_{symbols}$−1)) and symbols with a low mean may be excluded (e.g., according to if ($E(\hat{X}_i^l)$<Threshold) then $\hat{X}_i^l$=0 for i=0 to ($N_{symbols}$−1)). Other methods using any metrics from demapper 515 and/or channel decoder 520 may be used. For instance, the frequency domain symbol reconstruction component 530 may use covariance of symbols over constellation points and/or information from internal metrics rom within the channel decoder 520 indicating which data symbols are correct decisions and which are wrong decisions.

Frequency domain symbol reconstruction component 530 may output the signal to IFFT component 535, which may perform an IFFT on the new signal in the frequency domain to generate the signal in the time domain (e.g., according to $\hat{x}^l=\text{ifft}(\hat{X}^l)$). IFFT component 535 may output the new signal in the time domain to significant peak selection component 510.

Significant peak selection component 510 may use the first stage reconstructed signal 350, a clipping threshold 527, and the new signal to generate a first iteration of a second stage reconstructed signal. For instance, if, for a given point in the time domain, the new signal has a value above the clipping threshold 527, the first iteration of the second stage reconstructed signal may have the value of the new signal for that given point (e.g., $x_n^l=\hat{x}_n^l$ if $\hat{x}_n^l$>clipping threshold 527). If, however, at the given point in the time domain, the new signal has a value below the clipping threshold 527, the first iteration of the second stage reconstructed signal may have the value of the first stage reconstructed signal 350 at that point (e.g., $x_n^l=x_n^i$ if $\hat{x}_n^l$<clipping threshold 527). This process may be performed for each sample of the signals (e.g., from n=1 to $N_{FFT}$). The clipping threshold 527 may be received with the control signaling received by peaks signal generator 340-b (e.g., the RPSIM message) or may be received in separate control signaling.

Upon generating the first iteration of the second stage reconstructed signal, the significant peak selection component 510 may perform an FFT on the first iteration of the second stage reconstruction signal (e.g., $X^l=\text{fft}(x^l)$) and may output the first iteration of the second stage reconstructed signal in the frequency domain to demapper 515, which may calculate and output a LLR for each bit of the first iteration of the second stage reconstructed signal. The demapper 515 may output the LLR for each bit to channel decoder 520. If a single iteration is to be performed, the channel decoder 520 may output data to outside of second stage component 505. If multiple iterations are to be performed (e.g., as according to a threshold value n), the new LLRs may be output to soft metric computation component 525 and the procedure as outlined above may continue until the multiple iterations have been performed. Once n iterations have been performed, the channel decoder 520 may output data for the nth iteration of the second stage reconstructed signal outside of the second stage component 505. If the channel decoder 520 uses a low-density parity check (LDPC) to decode the symbols, n may be decreased as compared to other types of decoding methods may be decreased (e.g., the number of iterations at channel decoder 520 used may be small).

In addition to using soft metrics, the method of running LLRs through channel decoder 520 may have several advantages. For instance, a-priori incorrect symbol decisions may be corrected by the channel decoder 520. Additionally, LLRs may be improved by the channel decoder 520, which may result in more accurate soft metric generation. Additionally, error propagation may be reduced.

Figure 6:
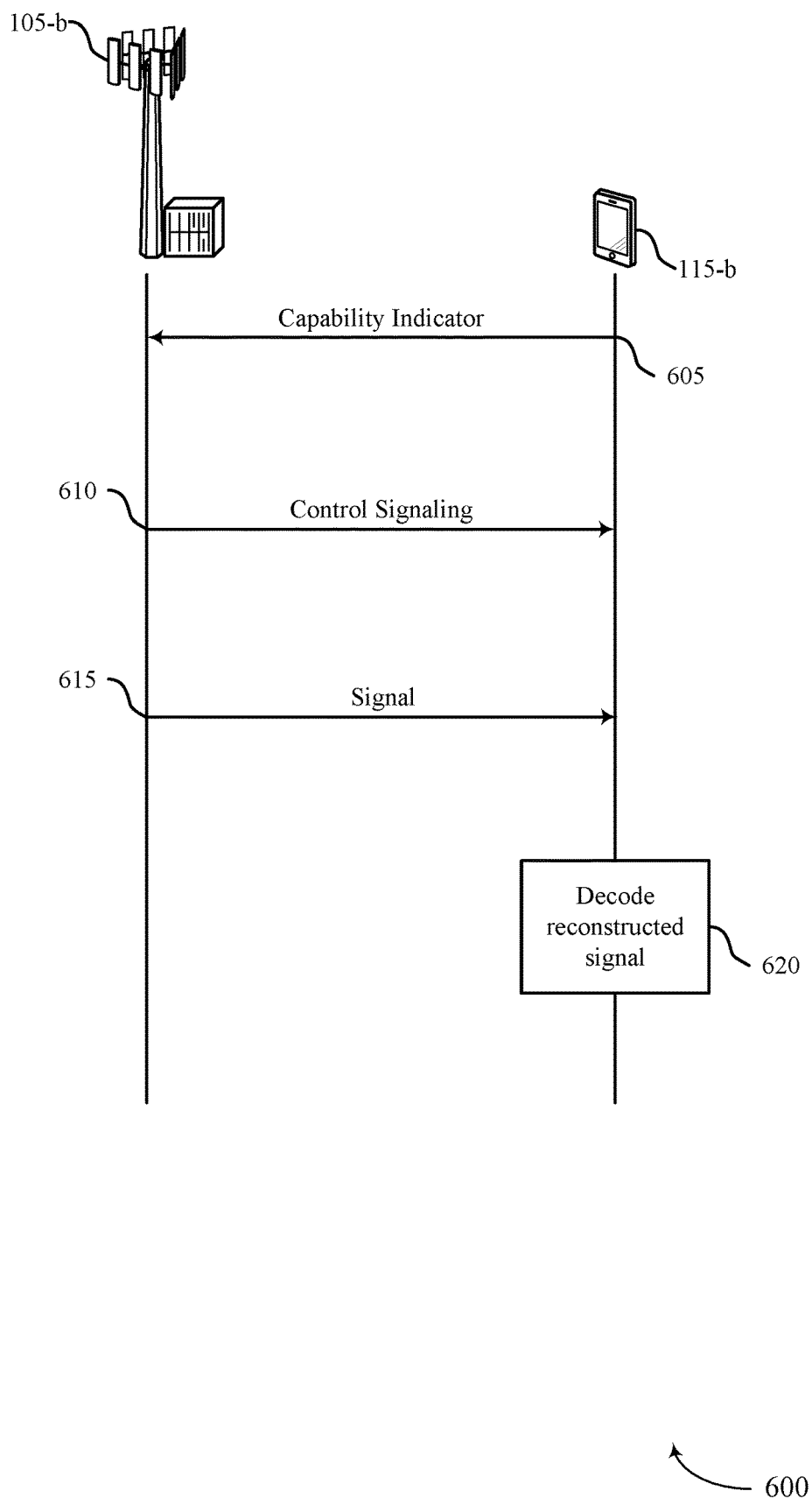
FIG. 6 illustrates an example of a process flow in accordance with aspects of the present disclosure.

FIG. 6 illustrates an example of a process flow 600 in accordance with aspects of the present disclosure. In some examples, process flow 600 may implement aspects of wireless communications system 100. Base station 105-*b* may be an example of a base station 105 as described with reference to FIG. 1 and UE 115-*b* may be an example of a UE 115 as described with reference to FIG. 1. Although the examples presented herein are directed to downlink communications, in some cases the methods may also be applied for uplink communications. For instance, for uplink communications a UE 115 may perform the functions of base station 105-*b* as disclosed herein and a base station 105 may perform the functions of UE 115-*b* as disclosed herein.

At 605, UE 115-*b* may transmit a capability indicator indicating a capability of UE 115-*b* to perform peak reconstruction using soft metrics on symbol decisions. Base station 105-*b* may receive the capability indicator. In some cases, the capability may be a capability of the UE to perform the peak reconstruction that is coded peak reconstruction. The capability indicator may include one or more bits indicating if UE 115-*a* has a turbo peaks reconstruction capability as described herein (see FIG. 4), a turbo coded peaks reconstruction capability as described herein (see FIG. 5), or both. UE 115-*a* may transmit the capability indicator if UE 115-*a* has the turbo peaks reconstruction capability, the turbo coded peaks reconstruction capability, or both.

At 610, base station 105-*b* may transmit control signaling indicating a clipping level applied to generate a signal and a subset of peaks clipped from the signal. In some cases, the clipping level may be a threshold at which the signal is clipped. In some examples, the control signaling may indicate each location and amplitude of a clipped peak sample for the subset of the peaks clipped from the signal. The control signaling may indicate to perform the peak reconstruction using the soft metrics on symbol decisions during decoding of the reconstructed signal. The base station 105-*b* may transmit the control signaling may via a control channel or in a control message multiplexed on a data channel. UE 115-*b* may receive the control signaling. In some cases, base station 105-*b* may select which peaks to clip from the signal based on the capability received from UE 115-*b* at 605. In some cases, base station 105-*b* may transmit the control signaling (e.g., RPSIM control information) may be transmitted over a gaseous medium (e.g., air).

At 615, base station 105-*b* may transmit the signal generated in accordance with the control signaling. Base station 105-*b* may transmit the signal via a data channel. UE 115-*b* may receive the signal.

At 620, UE 115-*b* may decode a reconstructed signal generated based on at least one of performing the peak reconstruction on the signal using the soft metrics on symbol decisions, the clipping level, and the subset of the peaks clipped from the signal. Decoding may involve UE 115-*b* iteratively performing the peak reconstruction on the signal using the soft metrics on symbol decisions until no new peaks are generated during a current iteration of the peak reconstruction. Additionally or alternatively, decoding may involve UE 115-*b* iteratively performing the peak reconstruction on the signal using the soft metrics on symbol decisions to generate a set of candidate peaks to add to the signal to generate the reconstructed signal.

In some cases, decoding may involve decoding may involve performing a first stage of the peak reconstruction to generate a first stage reconstructed signal based on at least one of the signal, a location and amplitude of one or more of the subset of the peaks clipped from the signal, and the clipping level. Decoding may further involve performing a second stage of the peak reconstruction on the first stage reconstructed signal. In one example, performing the second stage on the first stage may generate the reconstructed signal based on performing at least one iteration of frequency domain symbol reconstruction using the soft metrics on symbol decisions generated by demapping at least one iteration of the first stage reconstructed signal. In another example, performing the second stage on the first stage may generate the reconstructed signal based on performing at least one iteration of frequency domain symbol reconstruction using the soft metrics on symbol decisions generated by demapping and channel decoding at least one iteration of the first stage reconstructed signal.

Figure 7:
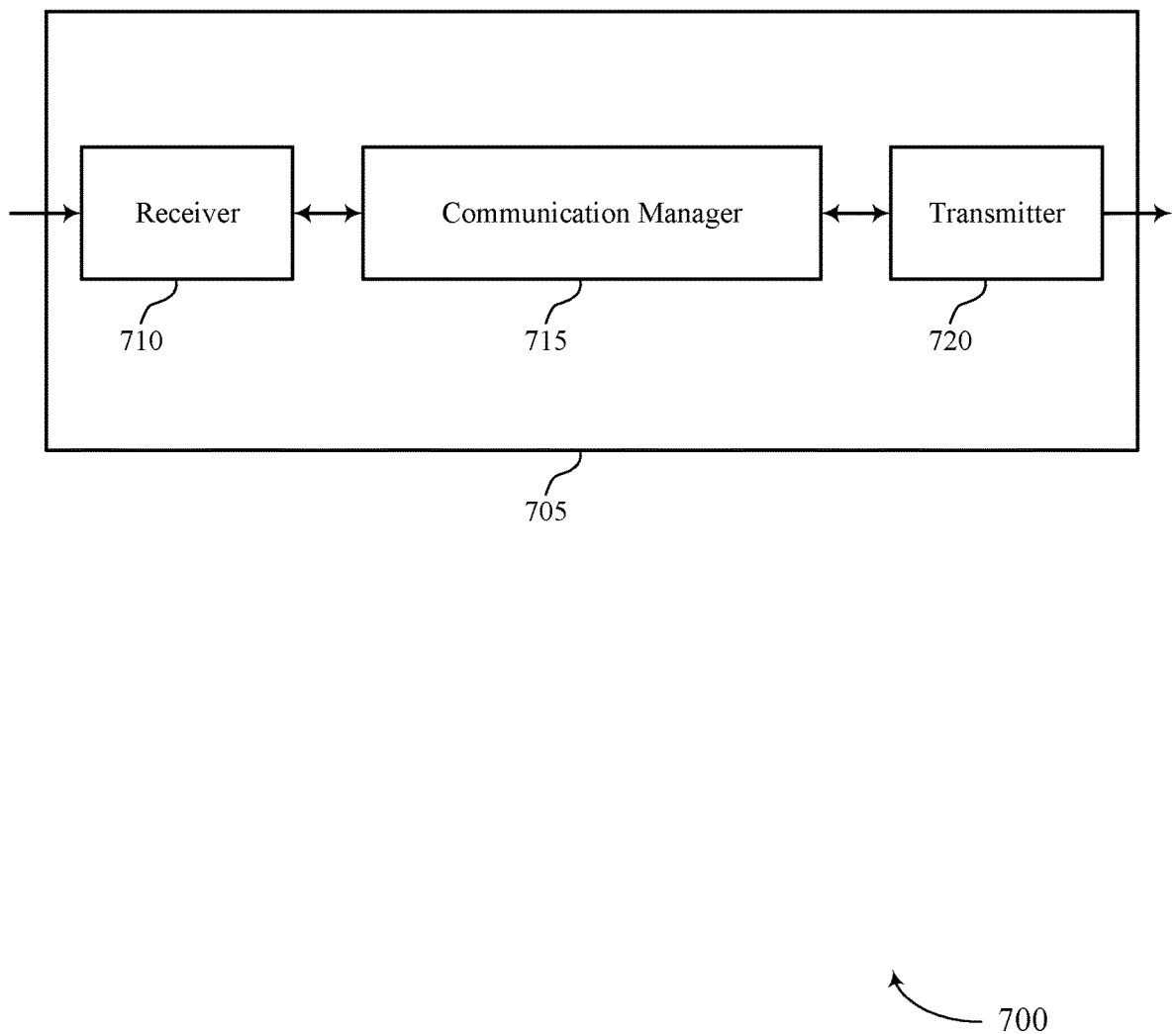
FIGS. 7 and 8 show block diagrams of devices in accordance with aspects of the present disclosure.

FIG. 7 shows a block diagram 700 of a device 705 in accordance with aspects of the present disclosure. The device 705 may be an example of aspects of a UE 115 as described herein. The device 705 may include a receiver 710, a communication manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to turbo peak reconstruction for a hybrid PAPR reduction scheme, etc.). Information may be passed on to other components of the device 705. The receiver 710 may be an example of aspects of the transceiver 1015 described with reference to FIG. 10. The receiver 710 may utilize a single antenna or a set of antennas.

The communication manager 715 may transmit a capability indicator indicating a capability of the UE to perform peak reconstruction using soft metrics on symbol decisions, receive, based on the capability indicator, control signaling indicating a clipping level applied to generate a signal and a subset of peaks clipped from the signal, receive the signal generated in accordance with the control signaling, and decode a reconstructed signal generated based on performing the peak reconstruction on the signal using the soft metrics on symbol decisions, the clipping level, and the subset of the peaks clipped from the signal. The communication manager 715 may be an example of aspects of the communication manager 1010 described herein.

In some examples, the communication manager 715 decoding the reconstructed signal based on performing the peak reconstruction on the signal using the soft metrics on symbol decisions may be associated with one or more advantages. For instance, performing peak reconstruction using soft metrics may quantify confidence in symbol decisions. Additionally, the signal that is produced via peak reconstruction using soft metrics may, on average, more closely resemble the original signal transmitted to the communication manager 715 as opposed to performing peak reconstruction with hard decisions. As such, the communication manager 715, when performing the methods described herein, may, on average, have a higher likelihood of correctly detecting symbols.

The communication manager 715, or its sub-components, may be implemented in hardware, code (e.g., software or firmware) executed by a processor, or any combination thereof. If implemented in code executed by a processor, the functions of the communication manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 715, or its sub-components, may be physically located at various positions, including being distributed such that portions of functions are implemented at different physical locations by one or more physical components. In some examples, the communication manager 715, or its sub-components, may be a separate and distinct component in accordance with various aspects of the present disclosure. In some examples, the communication manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1015 described with reference to FIG. 10. The transmitter 720 may utilize a single antenna or a set of antennas.

Figure 8:
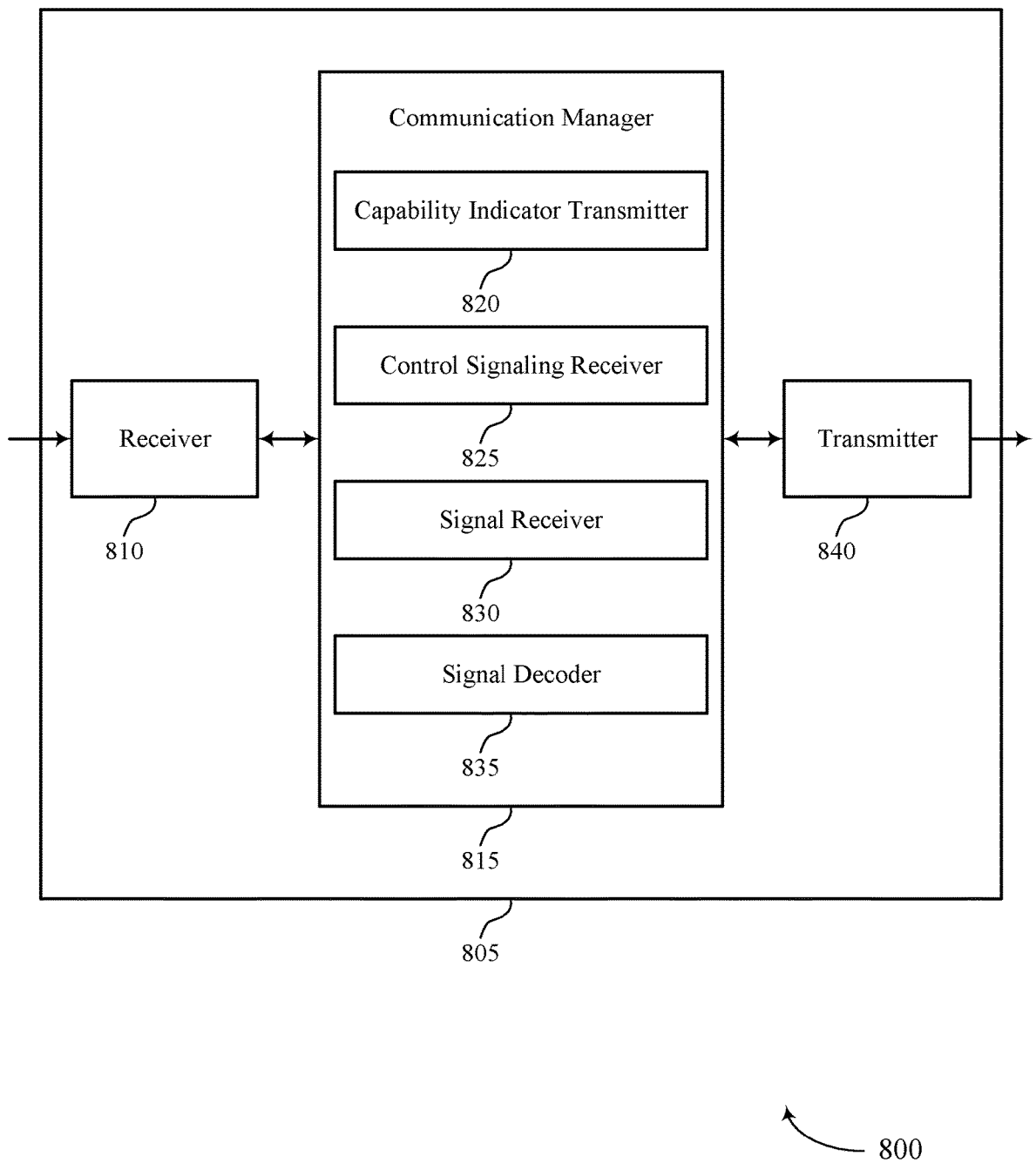

FIG. 8 shows a block diagram 800 of a device 805 in accordance with aspects of the present disclosure. The device 805 may be an example of aspects of a device 705, or a UE 115 as described herein. The device 805 may include a receiver 810, a communication manager 815, and a transmitter 840. The device 805 may also include a processor. Each of these components may be in communication with one another (e.g., via one or more buses). In some cases, device 805 may be an example of a system.

The receiver 810 may receive information such as packets, user data, or control information associated with various information channels (e.g., control channels, data channels, and information related to turbo peak reconstruction for a hybrid PAPR reduction scheme, etc.). Information may be passed on to other components of the device 805. The receiver 810 may be an example of aspects of the transceiver 1015 described with reference to FIG. 10. The receiver 810 may utilize a single antenna or a set of antennas.

The communication manager 815 may be an example of aspects of the communication manager 715 as described herein. The communication manager 815 may include a capability indicator transmitter 820, a control signaling receiver 825, a signal receiver 830, and a signal decoder 835. The communication manager 815 may be an example of aspects of the communication manager 1010 described herein.

The capability indicator transmitter 820 may transmit a capability indicator indicating a capability of the UE to perform peak reconstruction using soft metrics on symbol decisions.

The control signaling receiver 825 may receive, based on the capability indicator, control signaling indicating a clipping level applied to generate a signal and a subset of peaks clipped from the signal.

The signal receiver 830 may receive the signal generated in accordance with the control signaling.

The signal decoder 835 may decode a reconstructed signal generated based on performing the peak reconstruction on the signal using the soft metrics on symbol decisions, the clipping level, and the subset of the peaks clipped from the signal.

The transmitter 840 may transmit signals generated by other components of the device 805. In some examples, the transmitter 840 may be collocated with a receiver 810 in a transceiver module. For example, the transmitter 840 may be an example of aspects of the transceiver 1015 described with reference to FIG. 10. The transmitter 840 may utilize a single antenna or a set of antennas.

Figure 9:
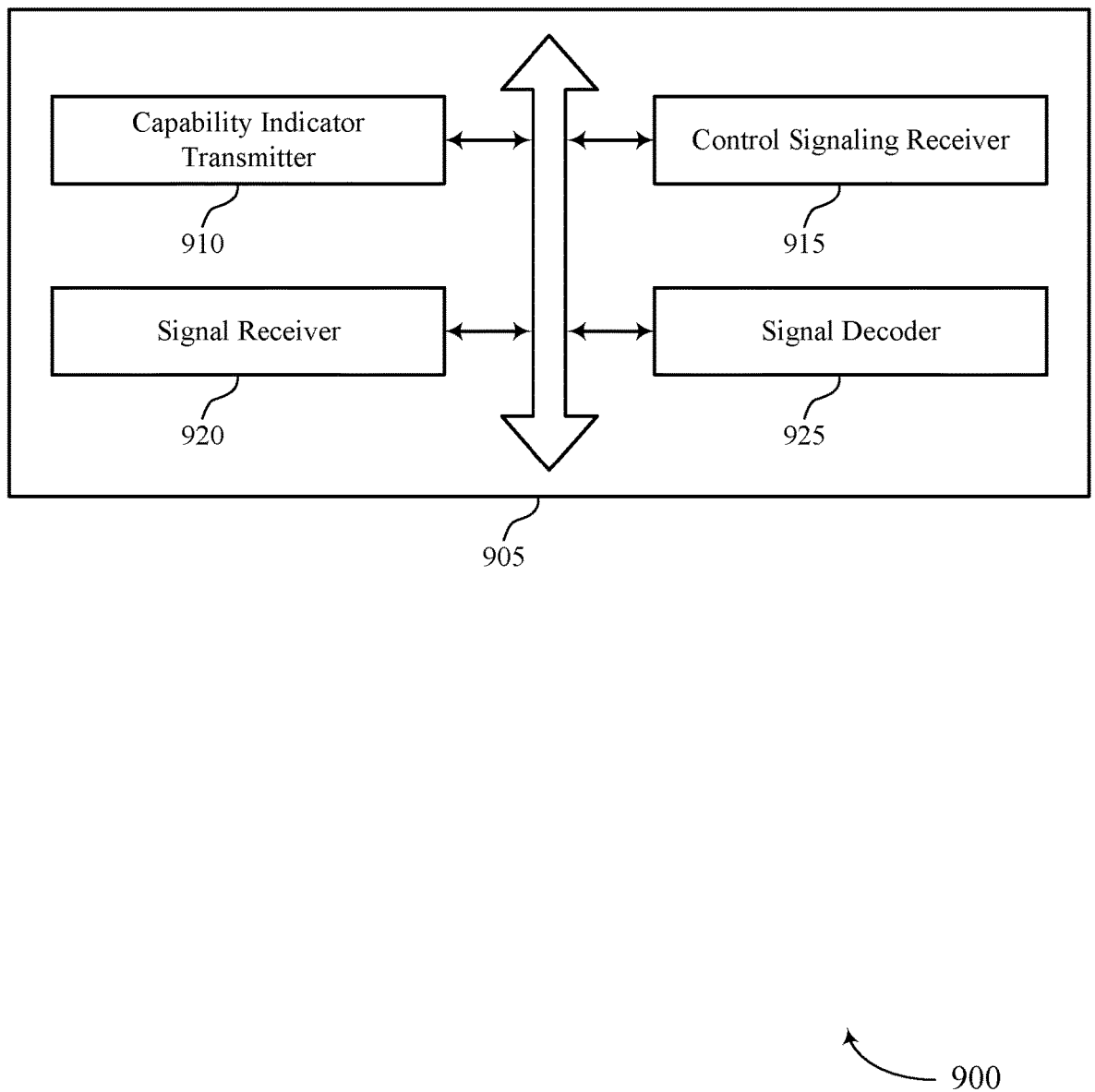
FIG. 9 shows a block diagram of a communication manager in accordance with aspects of the present disclosure.

FIG. 9 shows a block diagram 900 of a communication manager 905 in accordance with aspects of the present disclosure. The communication manager 905 may be an example of aspects of a communication manager 715, a communication manager 815, or a communication manager 1010 described herein. The communication manager 905 may include a capability indicator transmitter 910, a control signaling receiver 915, a signal receiver 920, and a signal decoder 925. Each of these modules may communicate, directly or indirectly, with one another (e.g., via one or more buses).

The capability indicator transmitter 910 may transmit a capability indicator indicating a capability of the UE to perform peak reconstruction using soft metrics on symbol decisions. In some examples, the capability indicator transmitter 910 may transmit the capability indicator indicating the capability of the UE to perform the peak reconstruction that is coded peak reconstruction.

The control signaling receiver 915 may receive, based on the capability indicator, control signaling indicating a clipping level applied to generate a signal and a subset of peaks clipped from the signal. In some examples, the control signaling receiver 915 may receive the control signaling indicating the clipping level that is a threshold at which the signal is clipped. In some examples, the control signaling receiver 915 may receive the control signaling indicating each location and amplitude of a clipped peak sample for the subset of the peaks clipped from the signal.

In some examples, the control signaling receiver 915 may receive the control signaling via a control channel. In some examples, the control signaling receiver 915 may receive the control signaling in a control message multiplexed on a data channel. In some examples, the control signaling receiver 915 may receive the control signaling indicating to perform the peak reconstruction using the soft metrics on symbol decisions during decoding of the reconstructed signal.

The signal receiver 920 may receive the signal generated in accordance with the control signaling. In some examples, the signal receiver 920 may receive the signal via a data channel.

The signal decoder 925 may decode a reconstructed signal generated based on performing the peak reconstruction on the signal using the soft metrics on symbol decisions, the clipping level, and the subset of the peaks clipped from the signal. In some examples, the signal decoder 925 may iteratively perform the peak reconstruction on the signal using the soft metrics on symbol decisions until no new peaks are generated during a current iteration of the peak reconstruction. In some examples, the signal decoder 925 may iteratively perform the peak reconstruction on the signal using the soft metrics on symbol decisions to generate a set of candidate peaks to add to the signal to generate the reconstructed signal. In some examples, the signal decoder 925 may perform a first stage of the peak reconstruction to generate a first stage reconstructed signal based on the signal, a location and amplitude of one or more of the subset of the peaks clipped from the signal, and the clipping level.

In some examples, the signal decoder 925 may perform a second stage of the peak reconstruction on the first stage reconstructed signal to generate the reconstructed signal based on performing at least one iteration of frequency domain symbol reconstruction using the soft metrics on symbol decisions generated by demapping at least one iteration of the first stage reconstructed signal. In some examples, the signal decoder 925 may perform a second stage of the peak reconstruction on the first stage reconstructed signal to generate the reconstructed signal based on performing at least one iteration of frequency domain symbol reconstruction using the soft metrics on symbol decisions generated by demapping and channel decoding at least one iteration of the first stage reconstructed signal.

Figure 10:
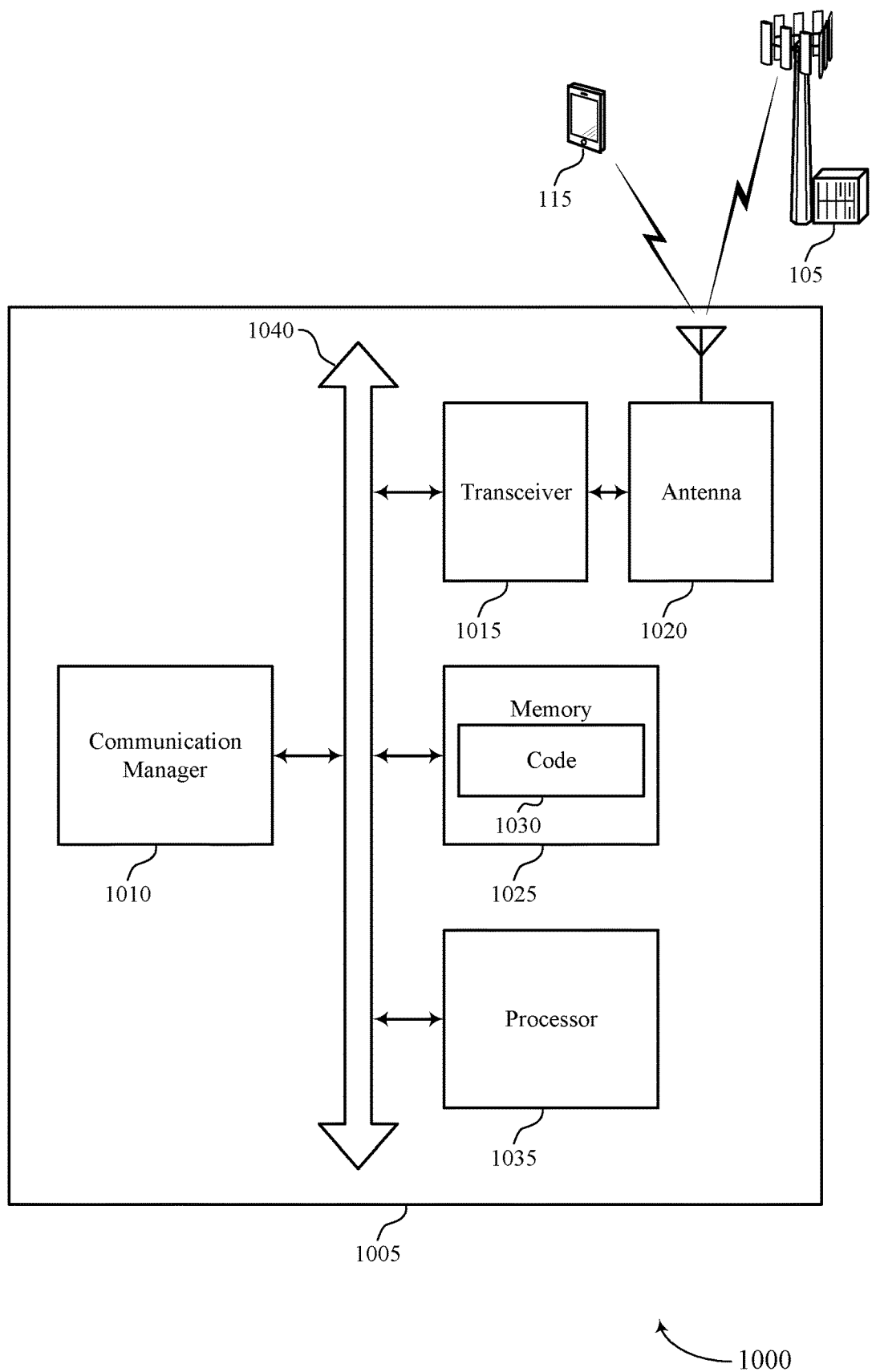
FIG. 10 shows a diagram of a system including a device in accordance with aspects of the present disclosure.

FIG. 10 shows a diagram of a system 1000 including a device 1005 in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communication manager 1010, a transceiver 1015, an antenna 1020, memory 1025, and a processor 1035. These components may be in electronic communication via one or more buses (e.g., bus 1040).

The communication manager 1010 may transmit a capability indicator indicating a capability of the UE to perform peak reconstruction using soft metrics on symbol decisions, receive, based on the capability indicator, control signaling indicating a clipping level applied to generate a signal and a subset of peaks clipped from the signal, receive the signal generated in accordance with the control signaling, and decode a reconstructed signal generated based on performing the peak reconstruction on the signal using the soft metrics on symbol decisions, the clipping level, and the subset of the peaks clipped from the signal.

In some examples, the communication manager 1010 decoding the reconstructed signal based on performing the peak reconstruction on the signal using the soft metrics on symbol decisions may be associated with one or more advantages. For instance, performing peak reconstruction using soft metrics may quantify confidence in symbol decisions. Additionally, the signal that is produced via peak reconstruction using soft metrics may, on average, more closely resemble the original signal transmitted to the communication manager 1010 as opposed to performing peak reconstruction with hard decisions. As such, the communication manager 1010, when performing the methods described herein, may, on average, have a higher likelihood of correctly detecting symbols.

The transceiver 1015 may communicate bi-directionally, via one or more antennas, wired, or wireless links as described above. For example, the transceiver 1015 may represent a wireless transceiver and may communicate bi-directionally with another wireless transceiver. The transceiver 1015 may also include a modem to modulate the packets and provide the modulated packets to the antennas for transmission, and to demodulate packets received from the antennas.

In some cases, the wireless device may include a single antenna 1020. However, in some cases the device may have more than one antenna 1020, which may be capable of concurrently transmitting or receiving multiple wireless transmissions. For instance, the device may have one or more transmission antennas by which transceiver 1015 may transmit a clipped signal (e.g., a clipped signal 210 as described with reference to FIG. 2) and one or more receive antennas by which transceiver 1015 may receive a clipped signal (e.g., a clipped signal 210 as described with reference to FIG. 2). The soft peak reconstruction and coded peak reconstruction techniques as described herein (e.g., with reference to FIGS. 4 and 5, respectively) may be utilized when transceiver 1015 uses the one or more transmission antennas to transmit a clipped signal and/or when the transceiver 1015 uses the one or more receive antennas to receive a clipped signal. In some cases, the transceiver 1015 may include a transmitter coupled with the one or more transmission antennas and a receiver coupled with the one or more receive antennas.

The memory 1025 may include random-access memory (RAM) and read-only memory (ROM). The memory 1025 may store computer-readable, computer-executable code 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

The code 1030 may include instructions to implement aspects of the present disclosure, including instructions to support wireless communications. The code 1030 may be stored in a non-transitory computer-readable medium such as system memory or other type of memory. In some cases, the code 1030 may not be directly executable by the processor 1035 but may cause a computer (e.g., when compiled and executed) to perform functions described herein.

The processor 1035 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1035 may be configured to operate a memory array using a memory controller. In other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting turbo peak reconstruction for a hybrid PAPR reduction scheme).

Figure 11:
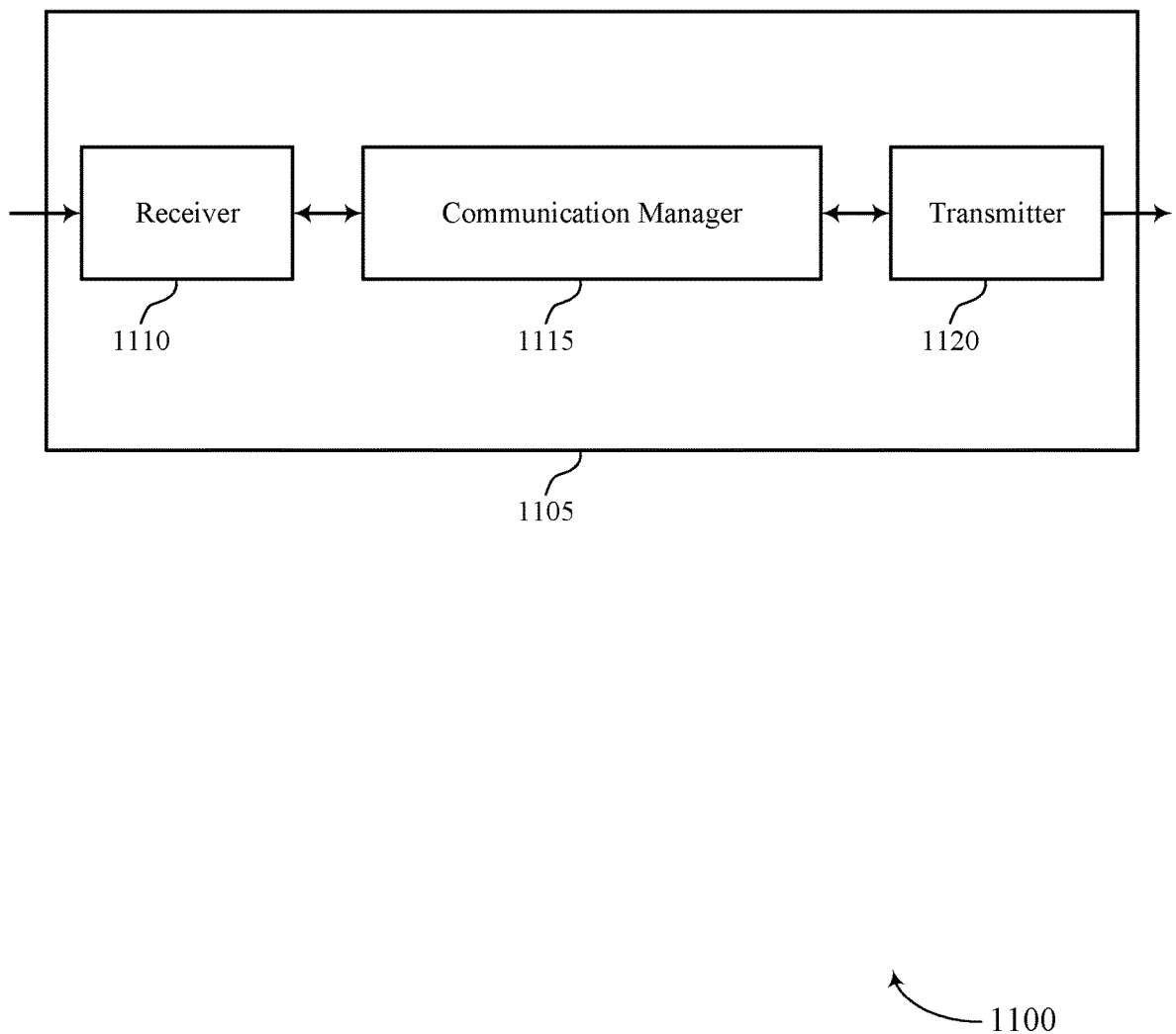
FIGS. 11 and 12 show block diagrams of devices in accordance with aspects of the present disclosure.

FIG. 11 shows a block diagram 1100 of a device 1105 in accordance with aspects of the present disclosure. The device 1105 may be an example of aspects of a base station 105 as described herein. The device 1105 may include a receiver 1110, a communication manager 1115, and a transmitter 1120. The device 1105 may also include a processor. Each of these components may be in communication with one another (e.g., via one or more buses). In some cases, device 1105 may be an example of a system The receiver 1110 may receive information such as packets, user data, or control information associated with various information channels (e.g., control channels, data channels, and information related to turbo peak reconstruction for a hybrid PAPR reduction scheme, etc.). Information may be passed on to other components of the device 1105. The receiver 1110 may be an example of aspects of the transceiver 1420 described with reference to FIG. 14. The receiver 1110 may utilize a single antenna or a set of antennas.

The communication manager 1115 may receive a capability indicator indicating a capability of a UE to perform peak reconstruction using soft metrics on symbol decisions, transmit, based on the capability indicator, control signaling indicating a clipping level applied to generate a signal and a subset of peaks clipped from the signal, and transmit the signal generated in accordance with the control signaling. The communication manager 1115 may be an example of aspects of the communication manager 1410 described herein.

In some examples, the communication manager 1115 transmitting the control signaling indicating the clipping signal and the subset of peaks may be associated with one or more advantages. For instance, transmitting the control signaling may enable peak reconstruction using soft metrics, which may quantify confidence in symbol decisions. Additionally, transmitting the control signaling may enable the production of a signal that is produced via peak reconstruction using soft metrics which, on average, may more closely resemble the original signal transmitted by the communication manager 1115 as opposed to performing peak reconstruction with hard decisions. As such, the communication manager 1115, when performing the methods described herein, may, on average, enable a higher likelihood of correctly detecting symbols at a receiving device.

The communication manager 1115, or its sub-components, may be implemented in hardware, code (e.g., software or firmware) executed by a processor, or any combination thereof. If implemented in code executed by a processor, the functions of the communication manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1115, or its sub-components, may be physically located at various positions, including being distributed such that portions of functions are implemented at different physical locations by one or more physical components. In some examples, the communication manager 1115, or its sub-components, may be a separate and distinct component in accordance with various aspects of the present disclosure. In some examples, the communication manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
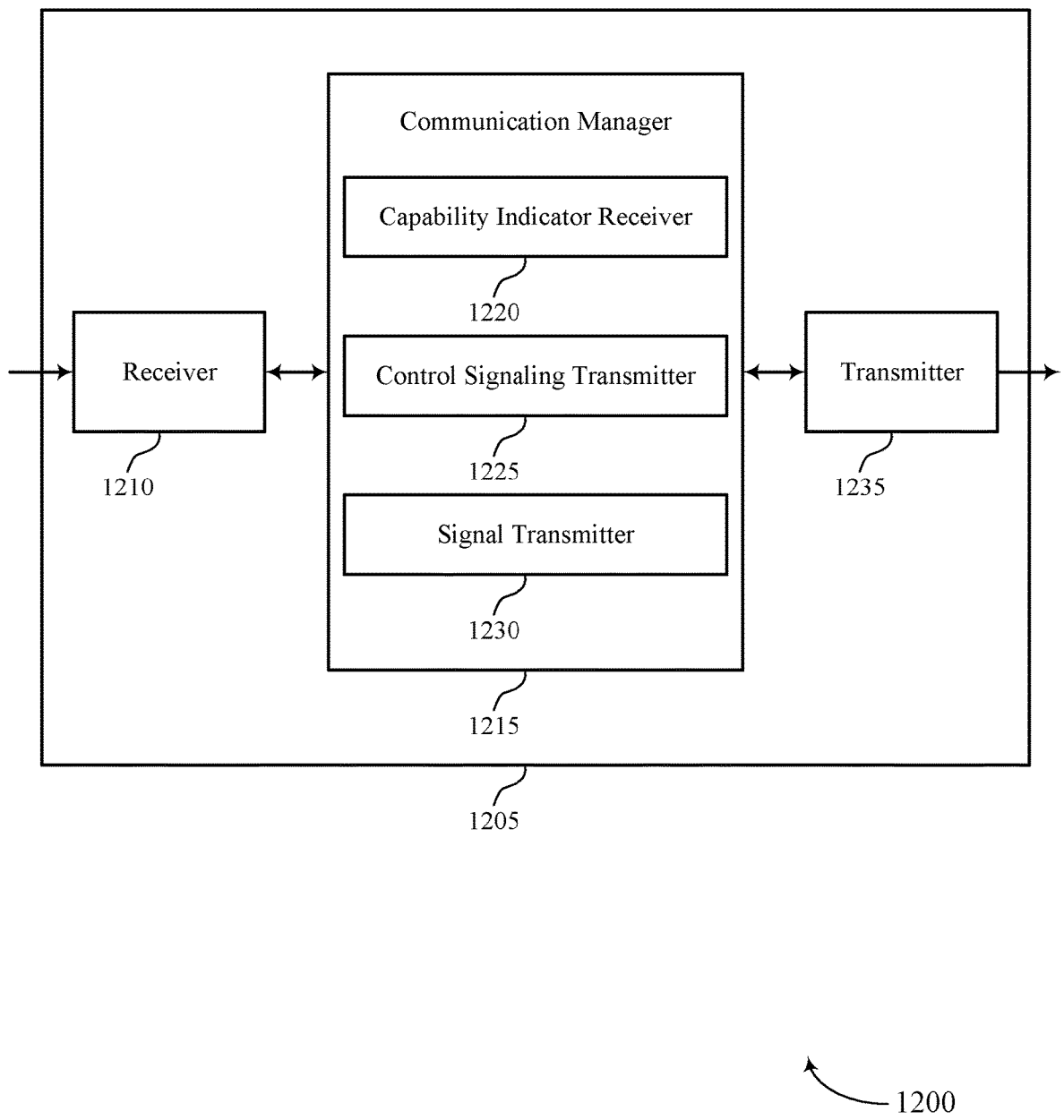

FIG. 12 shows a block diagram 1200 of a device 1205 in accordance with aspects of the present disclosure. The device 1205 may be an example of aspects of a device 1105, or a base station 105 as described herein. The device 1205 may include a receiver 1210, a communication manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to turbo peak reconstruction for a hybrid PAPR reduction scheme, etc.). Information may be passed on to other components of the device 1205. The receiver 1210 may be an example of aspects of the transceiver 1420 described with reference to FIG. 14. The receiver 1210 may utilize a single antenna or a set of antennas.

The communication manager 1215 may be an example of aspects of the communication manager 1115 as described herein. The communication manager 1215 may include a capability indicator receiver 1220, a control signaling transmitter 1225, and a signal transmitter 1230. The communication manager 1215 may be an example of aspects of the communication manager 1410 described herein.

The capability indicator receiver 1220 may receive a capability indicator indicating a capability of a UE to perform peak reconstruction using soft metrics on symbol decisions.

The control signaling transmitter 1225 may transmit, based on the capability indicator, control signaling indicating a clipping level applied to generate a signal and a subset of peaks clipped from the signal.

The signal transmitter 1230 may transmit the signal generated in accordance with the control signaling.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
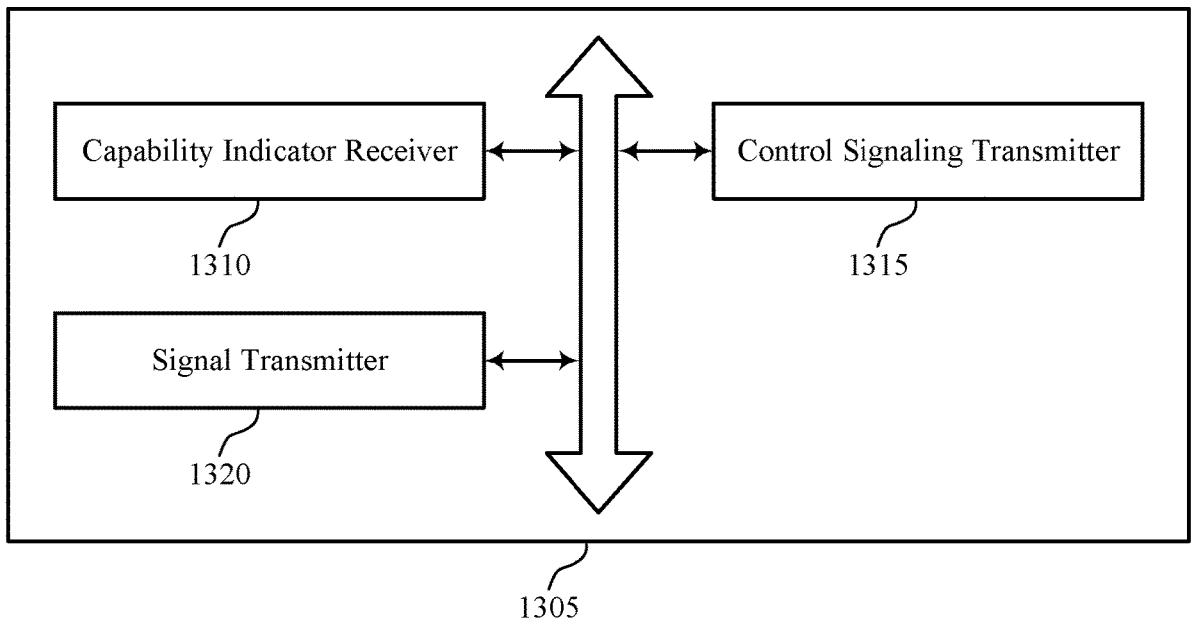
FIG. 13 shows a block diagram of a communication manager in accordance with aspects of the present disclosure.

FIG. 13 shows a block diagram 1300 of a communication manager 1305 in accordance with aspects of the present disclosure. The communication manager 1305 may be an example of aspects of a communication manager 1115, a communication manager 1215, or a communication manager 1410 described herein. The communication manager 1305 may include a capability indicator receiver 1310, a control signaling transmitter 1315, and a signal transmitter 1320. Each of these modules may communicate, directly or indirectly, with one another (e.g., via one or more buses).

The capability indicator receiver 1310 may receive a capability indicator indicating a capability of a UE to perform peak reconstruction using soft metrics on symbol decisions. In some examples, the capability indicator receiver 1310 may receive the capability indicator indicating the capability of the UE to perform the peak reconstruction that is coded peak reconstruction.

The control signaling transmitter 1315 may transmit, based on the capability indicator, control signaling indicating a clipping level applied to generate a signal and a subset of peaks clipped from the signal. In some examples, the control signaling transmitter 1315 may transmit the control signaling indicating the clipping level that is a threshold at which the signal is clipped. In some examples, the control signaling transmitter 1315 may transmit the control signaling indicating each location and amplitude of a clipped peak sample for the subset of the peaks clipped from the signal. In some examples, the control signaling transmitter 1315 may transmit the control signaling via a control channel. In some examples, the control signaling transmitter 1315 may transmit the control signaling indicating to perform the peak reconstruction using the soft metrics on symbol decisions output by a demapper. In some examples, the control signaling transmitter 1315 may transmit the control signaling indicating to perform the peak reconstruction using the soft metrics on symbol decisions output by a channel decoder.

The signal transmitter 1320 may transmit the signal generated in accordance with the control signaling. In some examples, the signal transmitter 1320 may transmit the signal via a data channel.

Figure 14:
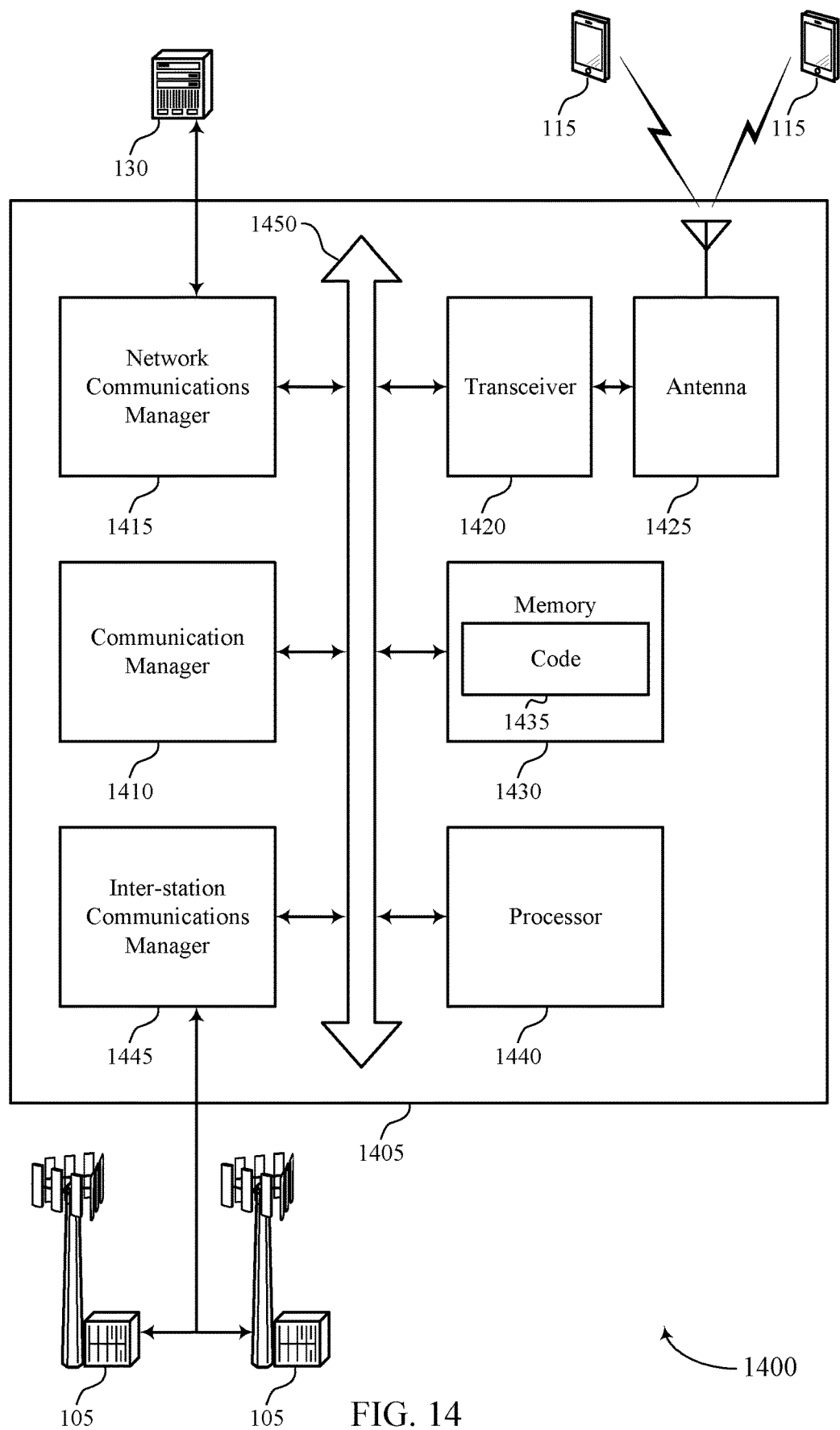
FIG. 14 shows a diagram of a system including a device in accordance with aspects of the present disclosure.

FIG. 14 shows a diagram of a system 1400 including a device 1405 in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communication manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communication manager 1410 may receive a capability indicator indicating a capability of a UE to perform peak reconstruction using soft metrics on symbol decisions, transmit, based on the capability indicator, control signaling indicating a clipping level applied to generate a signal and a subset of peaks clipped from the signal, and transmit the signal generated in accordance with the control signaling.

In some examples, the communication manager 1410 transmitting the control signaling indicating the clipping signal and the subset of peaks may be associated with one or more advantages. For instance, transmitting the control signaling may enable peak reconstruction using soft metrics, which may quantify confidence in symbol decisions. Additionally, transmitting the control signaling may enable the production of a signal that is produced via peak reconstruction using soft metrics which, on average, may more closely resemble the original signal transmitted by the communication manager 1410 as opposed to performing peak reconstruction with hard decisions. As such, the communication manager 1410, when performing the methods described herein, may, on average, enable a higher likelihood of correctly detecting symbols at a receiving device.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions. For instance, the device may have one or more transmission antennas by which transceiver 1420 may transmit a clipped signal (e.g., a clipped signal 210 as described with reference to FIG. 2) and one or more receive antennas by which transceiver 1420 may receive a clipped signal (e.g., a clipped signal 210 as described with reference to FIG. 2). The soft peak reconstruction and coded peak reconstruction techniques as described herein (e.g., with reference to FIGS. 4 and 5, respectively) may be utilized when transceiver 1420 uses the one or more transmission antennas to transmit a clipped signal and/or when the transceiver 1420 uses the one or more receive antennas to receive a clipped signal. In some cases, the transceiver 1420 may include a transmitter coupled with the one or more transmission antennas and a receiver coupled with the one or more receive antennas.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting turbo peak reconstruction for a hybrid PAPR reduction scheme).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
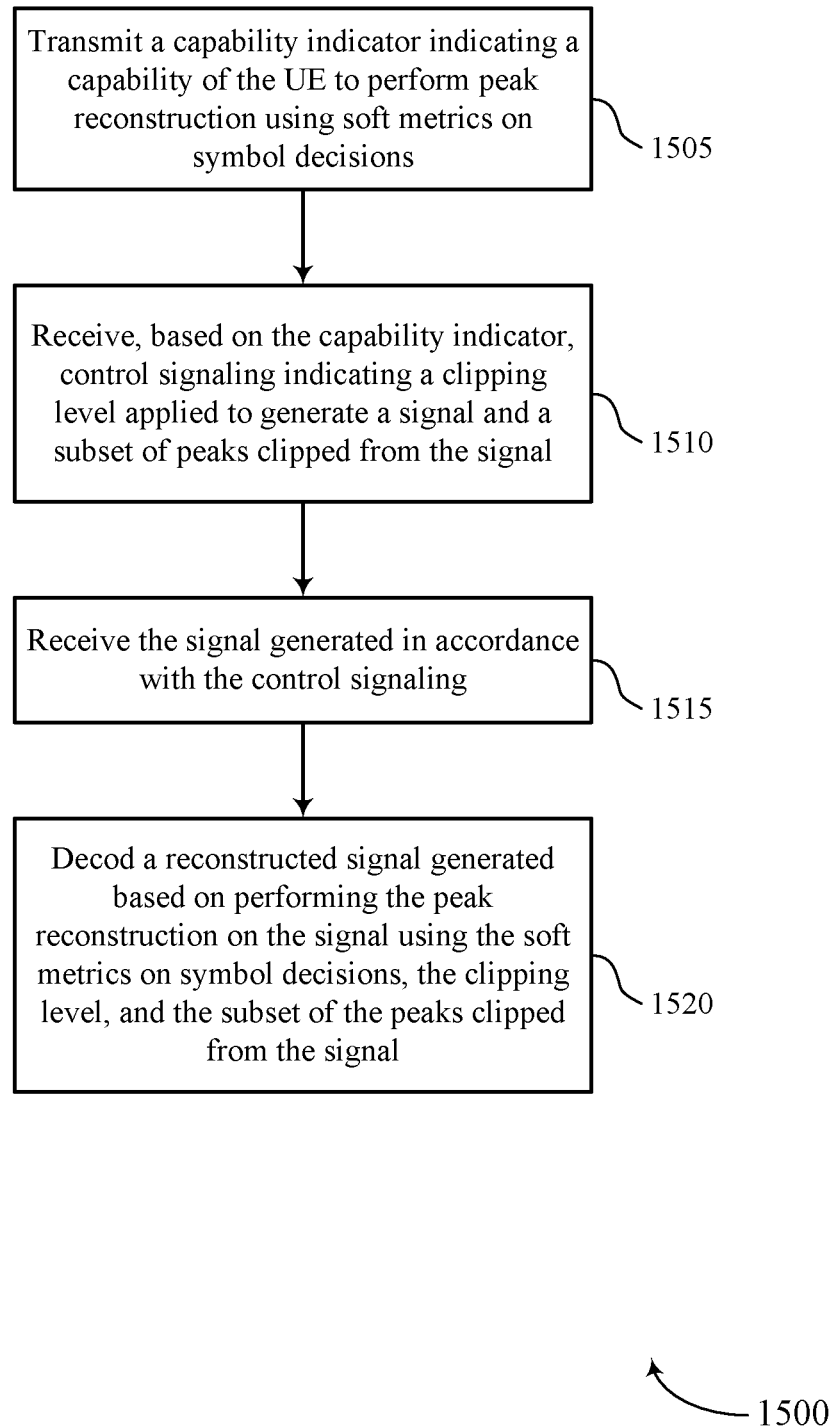
FIGS. 15 through 19 show flowcharts illustrating methods in accordance with aspects of the present disclosure.

FIG. 15 shows a flowchart illustrating a method 1500 in accordance with aspects of the present disclosure. The operations of method 1500 may be implemented by a UE 115 or its components as described herein. For example, the operations of method 1500 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1505, the UE may transmit a capability indicator indicating a capability of the UE to perform peak reconstruction using soft metrics on symbol decisions. The operations of 1505 may be performed according to the methods described herein. In some examples, aspects of the operations of 1505 may be performed by a capability indicator transmitter as described with reference to FIGS. 7 through 10.

At 1510, the UE may receive, based on the capability indicator, control signaling indicating a clipping level applied to generate a signal and a subset of peaks clipped from the signal. The operations of 1510 may be performed according to the methods described herein. In some examples, aspects of the operations of 1510 may be performed by a control signaling receiver as described with reference to FIGS. 7 through 10.

At 1515, the UE may receive the signal generated in accordance with the control signaling. The operations of 1515 may be performed according to the methods described herein. In some examples, aspects of the operations of 1515 may be performed by a signal receiver as described with reference to FIGS. 7 through 10.

At 1520, the UE may decode a reconstructed signal generated based on performing the peak reconstruction on the signal using the soft metrics on symbol decisions, the clipping level, and the subset of the peaks clipped from the signal. The operations of 1520 may be performed according to the methods described herein. In some examples, aspects of the operations of 1520 may be performed by a signal decoder as described with reference to FIGS. 7 through 10.

Figure 16:
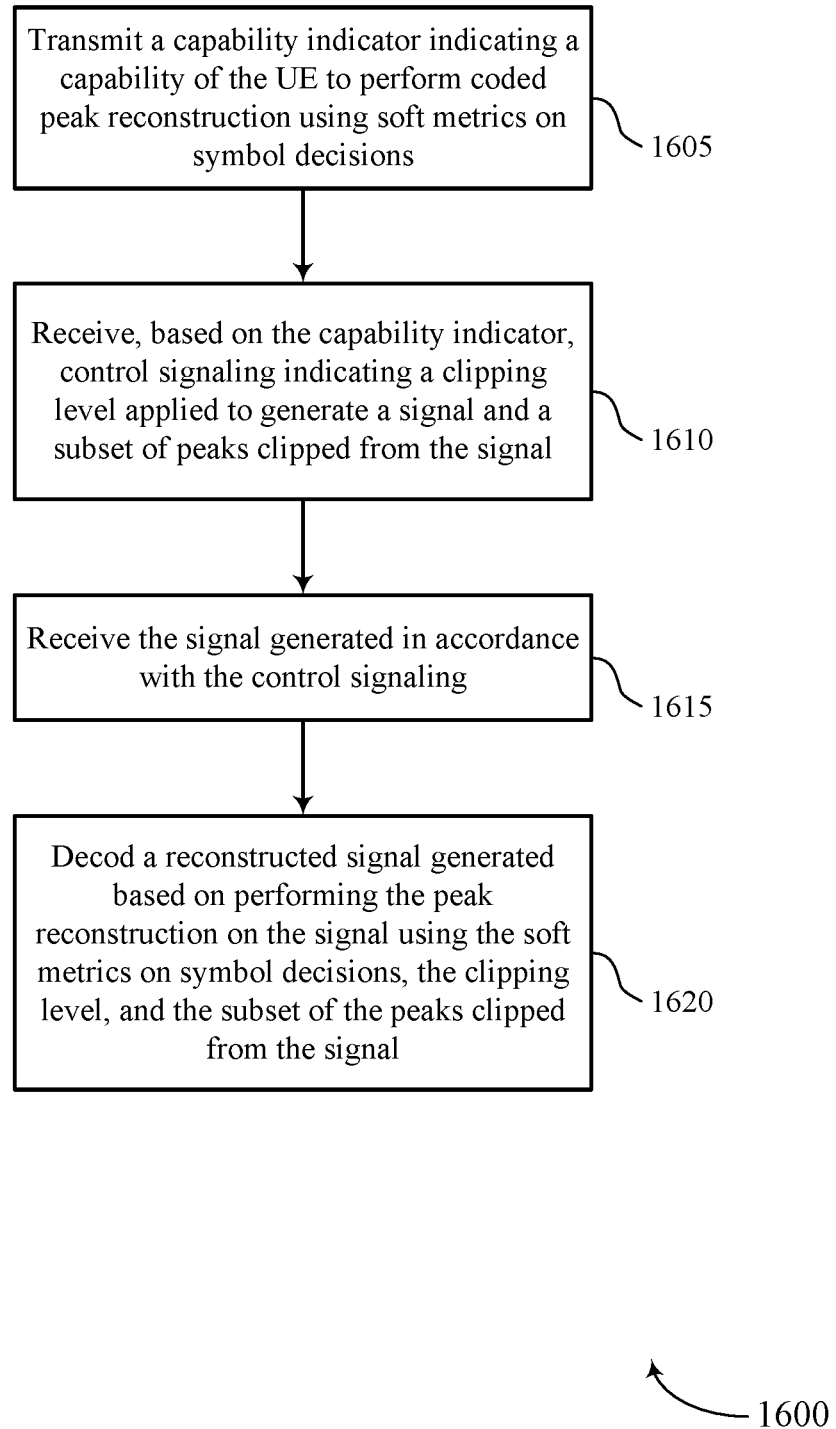

FIG. 16 shows a flowchart illustrating a method 1600 in accordance with aspects of the present disclosure. The operations of method 1600 may be implemented by a UE 115 or its components as described herein. For example, the operations of method 1600 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1605, the UE may transmit a capability indicator indicating a capability of the UE to perform coded peak reconstruction using soft metrics on symbol decisions. The operations of 1605 may be performed according to the methods described herein. In some examples, aspects of the operations of 1605 may be performed by a capability indicator transmitter as described with reference to FIGS. 7 through 10.

At 1610, the UE may receive, based on the capability indicator, control signaling indicating a clipping level applied to generate a signal and a subset of peaks clipped from the signal. The operations of 1610 may be performed according to the methods described herein. In some examples, aspects of the operations of 1610 may be performed by a control signaling receiver as described with reference to FIGS. 7 through 10.

At 1615, the UE may receive the signal generated in accordance with the control signaling. The operations of 1615 may be performed according to the methods described herein. In some examples, aspects of the operations of 1615 may be performed by a signal receiver as described with reference to FIGS. 7 through 10.

At 1620, the UE may decode a reconstructed signal generated based on performing the peak reconstruction on the signal using the soft metrics on symbol decisions, the clipping level, and the subset of the peaks clipped from the signal. The operations of 1620 may be performed according to the methods described herein. In some examples, aspects of the operations of 1620 may be performed by a signal decoder as described with reference to FIGS. 7 through 10.

Figure 17:
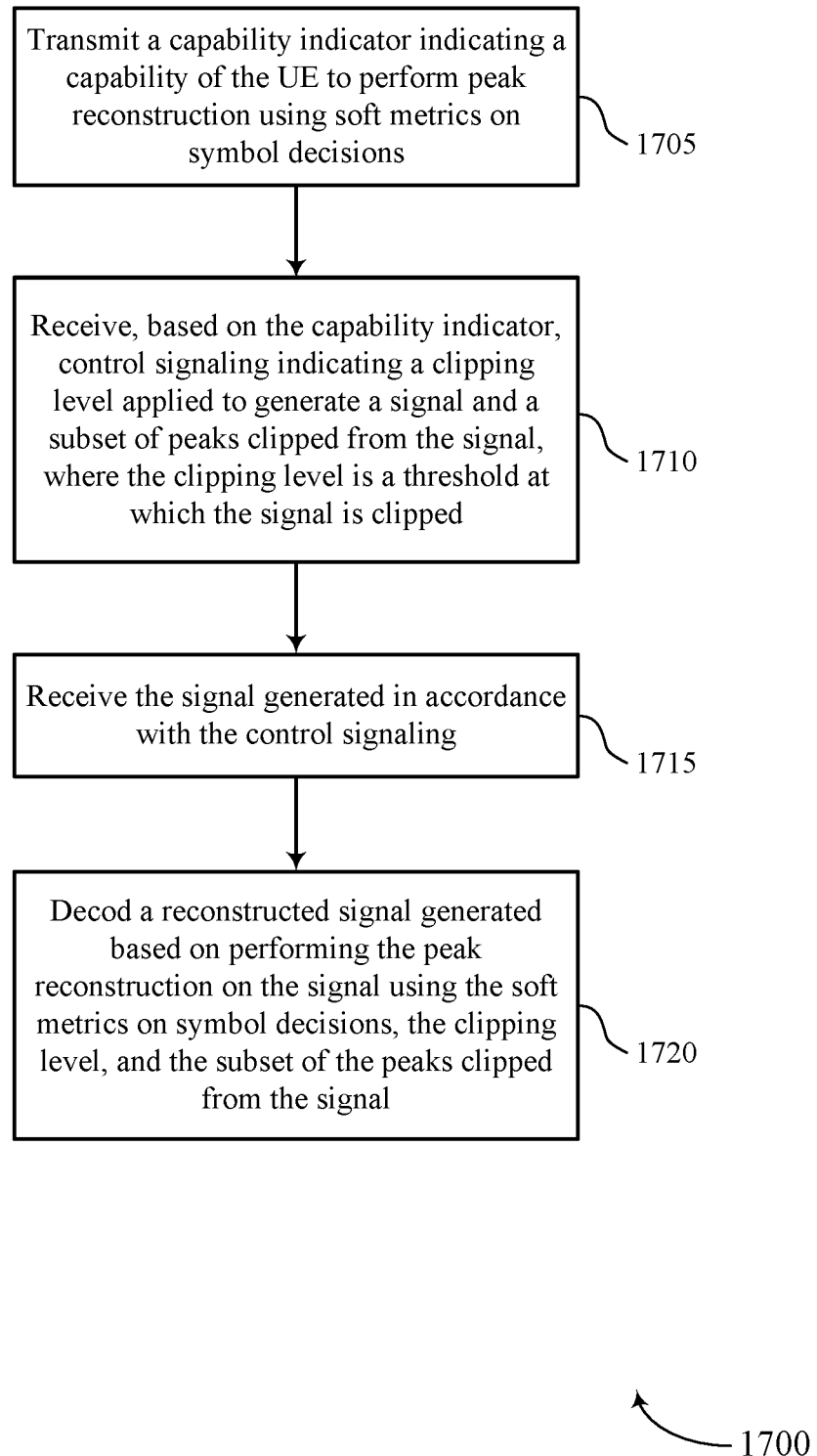

FIG. 17 shows a flowchart illustrating a method 1700 in accordance with aspects of the present disclosure. The operations of method 1700 may be implemented by a UE 115 or its components as described herein. For example, the operations of method 1700 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1705, the UE may transmit a capability indicator indicating a capability of the UE to perform peak reconstruction using soft metrics on symbol decisions. The operations of 1705 may be performed according to the methods described herein. In some examples, aspects of the operations of 1705 may be performed by a capability indicator transmitter as described with reference to FIGS. 7 through 10.

At 1710, based on the capability indicator, control signaling indicating a clipping level applied to generate a signal and a subset of peaks clipped from the signal, where the clipping level is a threshold at which the signal is clipped. The operations of 1710 may be performed according to the methods described herein. In some examples, aspects of the operations of 1710 may be performed by a control signaling receiver as described with reference to FIGS. 7 through 10.

At 1715, the UE may receive the signal generated in accordance with the control signaling. The operations of 1715 may be performed according to the methods described herein. In some examples, aspects of the operations of 1715 may be performed by a signal receiver as described with reference to FIGS. 7 through 10.

At 1720, the UE may decode a reconstructed signal generated based on performing the peak reconstruction on the signal using the soft metrics on symbol decisions, the clipping level, and the subset of the peaks clipped from the signal. The operations of 1720 may be performed according to the methods described herein. In some examples, aspects of the operations of 1720 may be performed by a signal decoder as described with reference to FIGS. 7 through 10.

Figure 18:
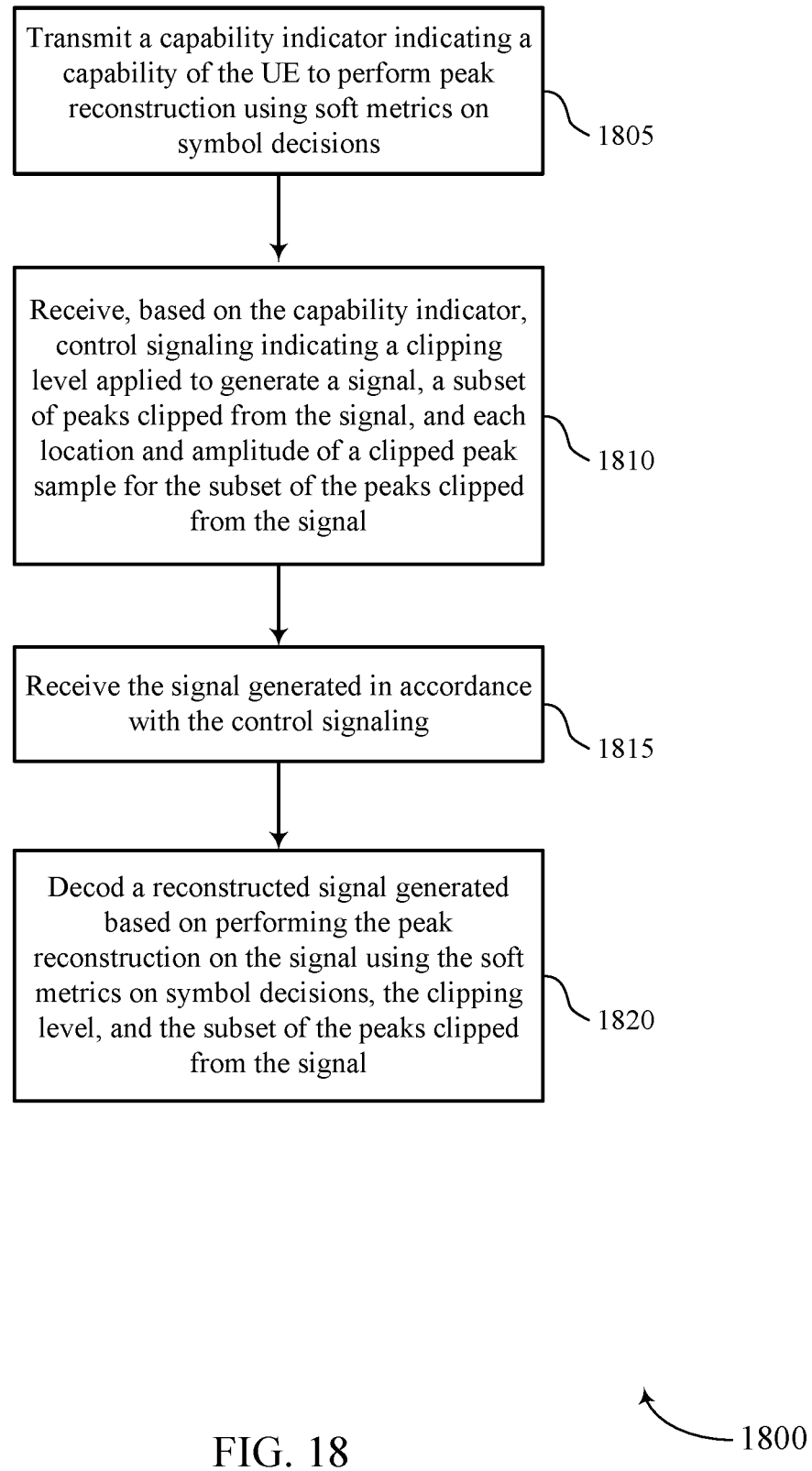

FIG. 18 shows a flowchart illustrating a method 1800 in accordance with aspects of the present disclosure. The operations of method 1800 may be implemented by a UE 115 or its components as described herein. For example, the operations of method 1800 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1805, the UE may transmit a capability indicator indicating a capability of the UE to perform peak reconstruction using soft metrics on symbol decisions. The operations of 1805 may be performed according to the methods described herein. In some examples, aspects of the operations of 1805 may be performed by a capability indicator transmitter as described with reference to FIGS. 7 through 10.

At 1810, the UE may receive, based on the capability indicator, control signaling indicating a clipping level applied to generate a signal, a subset of peaks clipped from the signal, and each location and amplitude of a clipped peak sample for the subset of the peaks clipped from the signal. The operations of 1810 may be performed according to the methods described herein. In some examples, aspects of the operations of 1810 may be performed by a control signaling receiver as described with reference to FIGS. 7 through 10.

At 1815, the UE may receive the signal generated in accordance with the control signaling. The operations of 1815 may be performed according to the methods described herein. In some examples, aspects of the operations of 1815 may be performed by a signal receiver as described with reference to FIGS. 7 through 10.

At 1820, the UE may decode a reconstructed signal generated based on performing the peak reconstruction on the signal using the soft metrics on symbol decisions, the clipping level, and the subset of the peaks clipped from the signal. The operations of 1820 may be performed according to the methods described herein. In some examples, aspects of the operations of 1820 may be performed by a signal decoder as described with reference to FIGS. 7 through 10.

Figure 19:
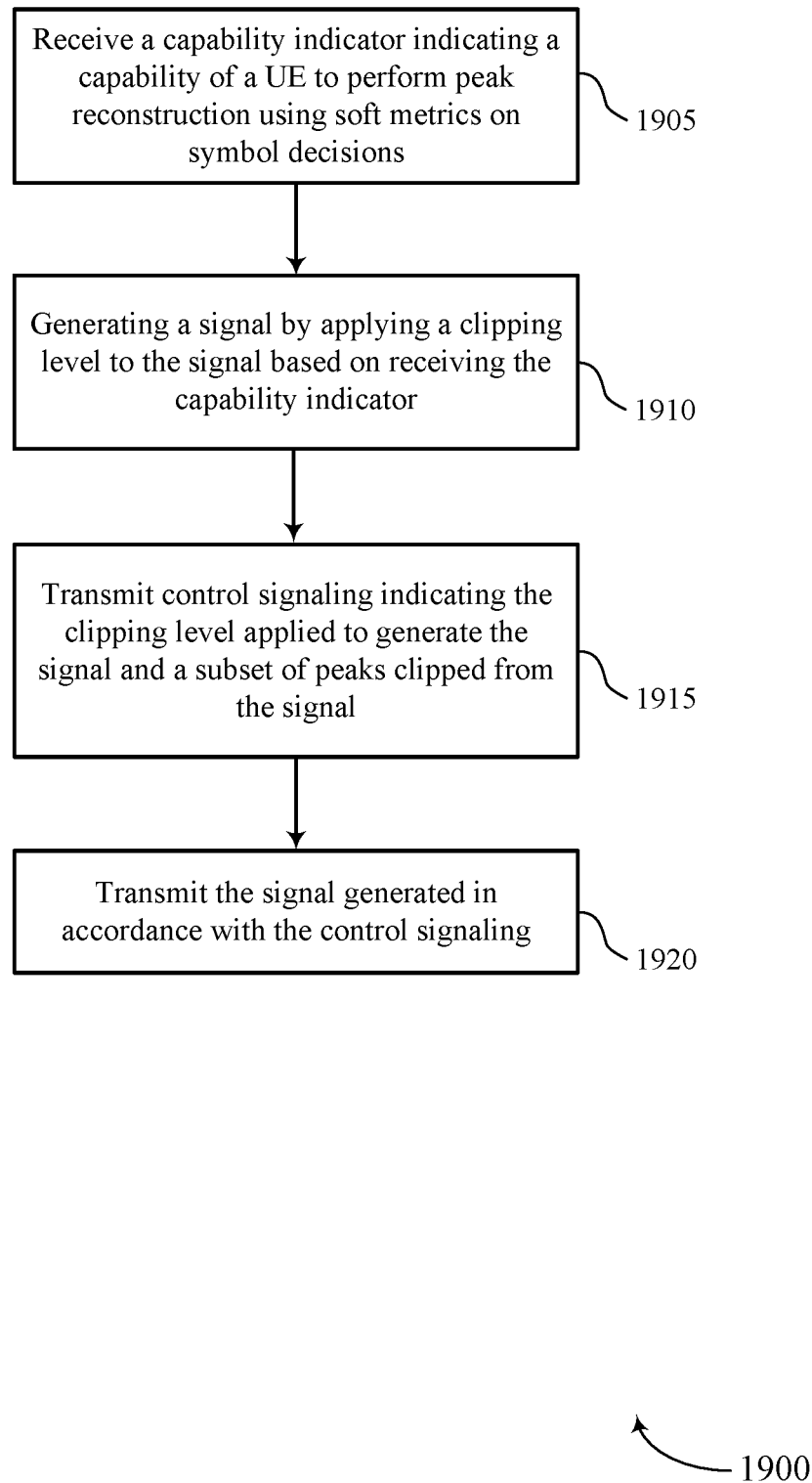

FIG. 19 shows a flowchart illustrating a method 1900 in accordance with aspects of the present disclosure. The operations of method 1900 may be implemented by a base station 105 or its components as described herein. For example, the operations of method 1900 may be performed by a communication manager as described with reference to FIGS. 11 through 14. In some examples, a base station may execute a set of instructions to control the functional elements of the base station to perform the described functions. Additionally or alternatively, a base station may perform aspects of the described functions using special-purpose hardware.

At 1905, the base station may receive a capability indicator indicating a capability of a UE to perform peak reconstruction using soft metrics on symbol decisions. The operations of 1905 may be performed according to the methods described herein. In some examples, aspects of the operations of 1905 may be performed by a capability indicator receiver as described with reference to FIGS. 11 through 14.

At 1910, the base station may generate a signal by applying a clipping level to the signal based on receiving the capability indicator. The operations of 1910 may be performed according to the methods described herein. In some examples, aspects of the operations of 1910 may be performed by communication manager 1215.

At 1915, the base station may transmit control signaling indicating the clipping level applied to generate the signal and a subset of peaks clipped from the signal. The operations of 1915 may be performed according to the methods described herein. In some examples, aspects of the operations of 1915 may be performed by a control signaling transmitter as described with reference to FIGS. 11 through 14.

At 1920, the base station may transmit the signal generated in accordance with the control signaling. The operations of 1920 may be performed according to the methods described herein. In some examples, aspects of the operations of 1920 may be performed by a signal transmitter as described with reference to FIGS. 11 through 14.

The following provides an overview of aspects of the present disclosure:

Aspect 1: A method for wireless communications by a UE, comprising: transmitting a capability indicator indicating a capability of the UE to perform peak reconstruction using soft metrics on symbol decisions; receiving, based at least in part on the capability indicator, control signaling indicating a clipping level applied to generate a signal and a subset of peaks clipped from the signal; receiving the signal generated in accordance with the control signaling; and decoding a reconstructed signal generated based at least in part on performing the peak reconstruction on the signal using the soft metrics on symbol decisions, the clipping level, and the subset of the peaks clipped from the signal.

Aspect 2: The method of aspect 1, wherein transmitting the capability indicator comprises: transmitting the capability indicator indicating the capability of the UE to perform the peak reconstruction that is coded peak reconstruction.

Aspect 3: The method of any of aspects 1 through 2, wherein receiving the control signaling comprises: receiving the control signaling indicating the clipping level that is a threshold at which the signal is clipped.

Aspect 4: The method of any of aspects 1 through 3, wherein receiving the control signaling comprises: receiving the control signaling indicating each location and amplitude of a clipped peak sample for the subset of the peaks clipped from the signal.

Aspect 5: The method of any of aspects 1 through 4, wherein receiving the control signaling comprises: receiving the control signaling via a control channel.

Aspect 6: The method of any of aspects 1 through 5, wherein receiving the control signaling comprises: receiving the control signaling in a control message multiplexed on a data channel.

Aspect 7: The method of any of aspects 1 through 6, wherein receiving the control signaling comprises: receiving the control signaling indicating to perform the peak reconstruction using the soft metrics on symbol decisions during decoding of the reconstructed signal.

Aspect 8: The method of any of aspects 1 through 7, wherein receiving the signal comprises: receiving the signal via a data channel.

Aspect 9: The method of any of aspects 1 through 8, wherein decoding the reconstructed signal comprises: iteratively performing the peak reconstruction on the signal using the soft metrics on symbol decisions until no new peaks are generated during a current iteration of the peak reconstruction.

Aspect 10: The method of any of aspects 1 through 9, wherein decoding the reconstructed signal comprises: iteratively performing the peak reconstruction on the signal using the soft metrics on symbol decisions to generate a set of candidate peaks to add to the signal to generate the reconstructed signal.

Aspect 11: The method of any of aspects 1 through 10, wherein decoding the reconstructed signal comprises: performing a first stage of the peak reconstruction to generate a first stage reconstructed signal based at least in part on the signal, a location and amplitude of one or more of the subset of the peaks clipped from the signal, and the clipping level.

Aspect 12: The method of aspect 11, wherein decoding the reconstructed signal comprises: performing a second stage of the peak reconstruction on the first stage reconstructed signal to generate the reconstructed signal based at least in part on performing at least one iteration of frequency domain symbol reconstruction using the soft metrics on symbol decisions generated by demapping at least one iteration of the first stage reconstructed signal.

Aspect 13: The method of any of aspects 11 through 12, wherein decoding the reconstructed signal comprises: performing a second stage of the peak reconstruction on the first stage reconstructed signal to generate the reconstructed signal based at least in part on performing at least one iteration of frequency domain symbol reconstruction using the soft metrics on symbol decisions generated by demapping and channel decoding at least one iteration of the first stage reconstructed signal.

Aspect 14: A method for wireless communications by a base station, comprising: receiving a capability indicator indicating a capability of a UE to perform peak reconstruction using soft metrics on symbol decisions; transmitting, based at least in part on the capability indicator, control signaling indicating a clipping level applied to generate a signal and a subset of peaks clipped from the signal; and transmitting the signal generated in accordance with the control signaling.

Aspect 15: The method of aspect 14, wherein receiving the capability indicator comprises: receiving the capability indicator indicating the capability of the UE to perform the peak reconstruction that is coded peak reconstruction.

Aspect 16: The method of any of aspects 14 through 15, wherein transmitting the control signaling comprises: transmitting the control signaling indicating the clipping level that is a threshold at which the signal is clipped.

Aspect 17: The method of any of aspects 14 through 16, wherein transmitting the control signaling comprises: transmitting the control signaling indicating each location and amplitude of a clipped peak sample for the subset of the peaks clipped from the signal.

Aspect 18: The method of any of aspects 14 through 17, wherein transmitting the control signaling comprises: transmitting the control signaling via a control channel.

Aspect 19: The method of any of aspects 14 through 18, wherein transmitting the control signaling comprises: transmitting the control signaling indicating to perform the peak reconstruction using the soft metrics on symbol decisions output by a demapper.

Aspect 20: The method of any of aspects 14 through 19, wherein transmitting the control signaling comprises: transmitting the control signaling indicating to perform the peak reconstruction using the soft metrics on symbol decisions output by a channel decoder.

Aspect 21: The method of any of aspects 14 through 20, wherein transmitting the signal comprises: transmitting the signal via a data channel.

Aspect 22: An apparatus for wireless communications by a UE, comprising a processor; memory coupled with the processor; and instructions stored in the memory and executable by the processor to cause the apparatus to perform a method of any of aspects 1 through 13.

Aspect 23: An apparatus for wireless communications by a UE, comprising at least one means for performing a method of any of aspects 1 through 13.

Aspect 24: A non-transitory computer-readable medium storing code for wireless communications by a UE, the code comprising instructions executable by a processor to perform a method of any of aspects 1 through 13.

Aspect 25: An apparatus for wireless communications by a base station, comprising a processor; memory coupled with the processor; and instructions stored in the memory and executable by the processor to cause the apparatus to perform a method of any of aspects 14 through 21.

Aspect 26: An apparatus for wireless communications by a base station, comprising at least one means for performing a method of any of aspects 14 through 21.

Aspect 27: A non-transitory computer-readable medium storing code for wireless communications by a base station, the code comprising instructions executable by a processor to perform a method of any of aspects 14 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    transmitting a capability indicator indicating a capability of the UE to perform peak reconstruction using soft metrics on symbol decisions;
    receiving, based at least in part on the capability indicator, control signaling indicating a clipping level applied to generate a signal and a subset of peaks clipped from the signal;
    receiving the signal generated in accordance with the control signaling; and
    decoding a reconstructed signal generated based at least in part on performing the peak reconstruction on the signal using the soft metrics on symbol decisions, the clipping level, and the subset of the peaks clipped from the signal.

2. The method of claim 1, wherein transmitting the capability indicator comprises:
    transmitting the capability indicator indicating the capability of the UE to perform the peak reconstruction that is coded peak reconstruction.

3. The method of claim 1, wherein receiving the control signaling comprises:
    receiving the control signaling indicating the clipping level that is a threshold at which the signal is clipped.

4. The method of claim 1, wherein receiving the control signaling comprises:
    receiving the control signaling indicating each location and amplitude of a clipped peak sample for the subset of the peaks clipped from the signal.

5. The method of claim 1, wherein receiving the control signaling comprises:
    receiving the control signaling via a control channel.

6. The method of claim 1, wherein receiving the control signaling comprises:
    receiving the control signaling in a control message multiplexed on a data channel.

7. The method of claim 1, wherein receiving the control signaling comprises:
    receiving the control signaling indicating to perform the peak reconstruction using the soft metrics on symbol decisions during decoding of the reconstructed signal.

8. The method of claim 1, wherein receiving the signal comprises:
    receiving the signal via a data channel.

9. The method of claim 1, wherein decoding the reconstructed signal comprises:
    iteratively performing the peak reconstruction on the signal using the soft metrics on symbol decisions until no new peaks are generated during a current iteration of the peak reconstruction.

10. The method of claim 1, wherein decoding the reconstructed signal comprises:
    iteratively performing the peak reconstruction on the signal using the soft metrics on symbol decisions to generate a set of candidate peaks to add to the signal to generate the reconstructed signal.

11. The method of claim 1, wherein decoding the reconstructed signal comprises:
    performing a first stage of the peak reconstruction to generate a first stage reconstructed signal based at least in part on the signal, a location and amplitude of one or more of the subset of the peaks clipped from the signal, and the clipping level.

12. The method of claim 11, wherein decoding the reconstructed signal comprises:
    performing a second stage of the peak reconstruction on the first stage reconstructed signal to generate the reconstructed signal based at least in part on performing at least one iteration of frequency domain symbol reconstruction using the soft metrics on symbol decisions generated by demapping at least one iteration of the first stage reconstructed signal.

13. The method of claim 11, wherein decoding the reconstructed signal comprises:
    performing a second stage of the peak reconstruction on the first stage reconstructed signal to generate the reconstructed signal based at least in part on performing at least one iteration of frequency domain symbol reconstruction using the soft metrics on symbol decisions generated by demapping and channel decoding at least one iteration of the first stage reconstructed signal.

14. A method for wireless communications by a base station, comprising:
    receiving a capability indicator indicating a capability of a user equipment (UE) to perform peak reconstruction using soft metrics on symbol decisions;

transmitting, based at least in part on the capability indicator, control signaling indicating a clipping level applied to generate a signal and a subset of peaks clipped from the signal; and transmitting the signal generated in accordance with the control signaling.

15. The method of claim 14, wherein receiving the capability indicator comprises:

receiving the capability indicator indicating the capability of the UE to perform the peak reconstruction that is coded peak reconstruction.

16. The method of claim 14, wherein transmitting the control signaling comprises:

transmitting the control signaling indicating the clipping level that is a threshold at which the signal is clipped.

17. The method of claim 14, wherein transmitting the control signaling comprises:

transmitting the control signaling indicating each location and amplitude of a clipped peak sample for the subset of the peaks clipped from the signal.

18. The method of claim 14, wherein transmitting the control signaling comprises:

transmitting the control signaling via a control channel.

19. The method of claim 14, wherein transmitting the control signaling comprises:

transmitting the control signaling indicating to perform the peak reconstruction using the soft metrics on symbol decisions output by a demapper.

20. The method of claim 14, wherein transmitting the control signaling comprises:

transmitting the control signaling indicating to perform the peak reconstruction using the soft metrics on symbol decisions output by a channel decoder.

21. The method of claim 14, wherein transmitting the signal comprises:

transmitting the signal via a data channel.

22. An apparatus for wireless communications by a user equipment (UE), comprising:

a processor, memory in electronic communication with the processor, and instructions stored in the memory and executable by the processor to cause the apparatus to:

transmit a capability indicator indicating a capability of the UE to perform peak reconstruction using soft metrics on symbol decisions;

receive, based at least in part on the capability indicator, control signaling indicating a clipping level applied to generate a signal and a subset of peaks clipped from the signal;

receive the signal generated in accordance with the control signaling; and decode a reconstructed signal generated based at least in part on performing the peak reconstruction on the signal using the soft metrics on symbol decisions, the clipping level, and the subset of the peaks clipped from the signal.

23. The apparatus of claim 22, further comprising a transmitter, wherein the instructions to transmit the capability indicator are executable by the processor to cause the apparatus to:

transmit, via the transmitter, the capability indicator indicating the capability of the UE to perform the peak reconstruction that is coded peak reconstruction.

24. The apparatus of claim 22, wherein the instructions to receive the control signaling are executable by the processor to cause the apparatus to:

receive the control signaling indicating the clipping level that is a threshold at which the signal is clipped.

25. The apparatus of claim 22, wherein the instructions to receive the control signaling are executable by the processor to cause the apparatus to:

receive the control signaling indicating each location and amplitude of a clipped peak sample for the subset of the peaks clipped from the signal.

26. The apparatus of claim 22, wherein the instructions to receive the control signaling are executable by the processor to cause the apparatus to:

receive the control signaling via a control channel.

27. The apparatus of claim 22, wherein the instructions to receive the control signaling are executable by the processor to cause the apparatus to:

receive the control signaling in a control message multiplexed on a data channel.

28. The apparatus of claim 22, wherein the instructions to receive the control signaling are executable by the processor to cause the apparatus to:

receive the control signaling indicating to perform the peak reconstruction using the soft metrics on symbol decisions during decoding of the reconstructed signal.

29. An apparatus for wireless communications by a base station, comprising:

a processor, memory in electronic communication with the processor, and instructions stored in the memory and executable by the processor to cause the apparatus to:

receive a capability indicator indicating a capability of a user equipment (UE) to perform peak reconstruction using soft metrics on symbol decisions;

transmit, based at least in part on the capability indicator, control signaling indicating a clipping level applied to generate a signal and a subset of peaks clipped from the signal; and transmit the signal generated in accordance with the control signaling.

30. The apparatus of claim 29, further comprising a receiver, wherein the instructions to receive the capability indicator are executable by the processor to cause the apparatus to:

receive, via the receiver, the capability indicator indicating the capability of the UE to perform the peak reconstruction that is coded peak reconstruction.

* * * * *